(12) United States Patent
Takahashi et al.

(10) Patent No.: US 7,123,423 B2
(45) Date of Patent: *Oct. 17, 2006

(54) ELECTRONIC IMAGING DEVICE

(75) Inventors: Yukinori Takahashi, Hachioji (JP);
Yasuo Asakura, Hachioji (JP); Naoki Fujii, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/969,457

(22) Filed: Oct. 20, 2004

(65) Prior Publication Data

US 2005/0052536 A1 Mar. 10, 2005

Related U.S. Application Data

(62) Division of application No. 09/618,812, filed on Jul. 18, 2000, now Pat. No. 6,829,011.

(30) Foreign Application Priority Data

Sep. 2, 1999 (JP) ................................. 11-248677
Sep. 2, 1999 (JP) ................................. 11-248678

(51) Int. Cl.
*G02B 15/14* (2006.01)
*H04N 2/225* (2006.01)

(52) U.S. Cl. ...................................... 359/698; 348/340

(58) Field of Classification Search ................ 348/340, 348/373, 374, 376; 359/694, 696, 698
See application file for complete search history.

(56) References Cited

U.S. PATENT DOCUMENTS

| 6,008,845 | A | 12/1999 | Ohyoshi |
| 6,041,195 | A | 3/2000 | Honda et al. |
| 6,181,380 | B1 | 1/2001 | Toyofuku et al. |
| 6,469,820 | B1 | 10/2002 | Mushiake et al. |
| 6,829,011 | B1* | 12/2004 | Higuchi et al. ............. 348/340 |
| 2001/0040626 | A1 | 11/2001 | Ohta et al. |
| 2002/0067426 | A1 | 6/2002 | Nagata et al. |
| 2002/0191974 | A1 | 12/2002 | Ota |

FOREIGN PATENT DOCUMENTS

| JP | 04-188968 A | 7/1992 |
| JP | 06-130305 A | 5/1994 |
| JP | 09-211287 A | 8/1997 |
| JP | 9-211287 A | 8/1997 |
| JP | 9-281578 A | 10/1997 |
| JP | 10-191125 A | 7/1998 |
| JP | 11-084209 A | 3/1999 |

* cited by examiner

*Primary Examiner*—David N. Spector
(74) *Attorney, Agent, or Firm*—Frishauf, Holtz, Goodman & Chick, P. C.

(57) ABSTRACT

An electronic imaging device is provided which includes a first lens group which takes in a luminous flux from a subject along a first optical axis, an optical axis conversion member which bends the luminous flux along a second optical axis which intersects with the first optical axis, a second lens which images the bent luminous flux to an imaging element, and an optical amount adjustment unit provided between the second lens group and the optical axis conversion member. An AF motor, a driving unit which drives the optical amount adjustment unit, and a zoom motor are each selectively arranged at one of four spaces formed by a first plane defined by the optical amount adjustment unit and a second plane defined by the first and second optical axes. The AF motor, the driving unit, and the zoom motor may all be arranged at one side of the second plane.

19 Claims, 11 Drawing Sheets

ELECTRONIC IMAGING DEVICE

CROSS-REFERENCE TO RELATED APPLICATIONS

The present application is a divisional application of U.S. application Ser. No. 09/618,812, filed Jul. 18, 2000, now U.S. Pat. No. 6,829,011, which claims the benefit of Japanese Patent Application No. 11-248677, filed Sep. 2, 1999, and Japanese Patent Application No. 11-248678, filed Sep. 2, 1999, the contents of which are incorporated herein by this reference.

BACKGROUND OF THE INVENTION

The present invention relates to an electronic imaging device, especially, to an electronic imaging device which improves a configuration of a shooting lens unit and an arrangement of an internal unit.

In general, in an electronic imaging device, especially an electronic camera (digital still camera), since the number of internal element components thereof is larger than that of the camera of the film installation type, the camera main body tends to become large and deteriorate portability, etc. Therefore, a lot of proposals to achieve the miniaturization are performed. Especially, when thickness in the optical axis direction of the camera main body becomes thick, the bad influence is caused for not only portability but also the holding stability at shooting. As a factor that the camera main body becomes thick, it is thought that the arrangement of the image display section such as various electric circuit board and LCD influences with the optical path length of the optical system.

First, concerning the optical path length of the optical system, by bending the optical system at a midpoint in an optical path, the method of making the camera main body compact is known well without changing the total length of the optical path length.

The following camera device is disclosed in, for example, Japanese Patent Application KOKAI Publication No. 9-281578. In this camera device, the wide-angle converter lens is rotatably and movably arranged to an incidence side of the telescopic master lens, which images an image of the subject on the imaging surface of the solid imaging element. This converter lens is rotated and moved at a position on the optical path from the subject to the master lens and a position outside an optical path, and the reflection mirror is arranged at the rotation center of the converter lens. As a result, the length of the device can be set to a short optical path length from the imaging surface to the reflection mirror, and the entire device is made compact.

The following imaging device is disclosed in Japanese Patent Application KOKAI Publication No. 9-211287. This imaging device installs the prism in which the inclined plane which reflects and deflects the luminous flux to the object side of the shooting system is made as an inside reflection side, and shortens length in the horizontal direction of the shooting system by constructing to perform imaging through the prism.

Regarding to the arrangement of the image display section such as various electric circuit board and LCD, a method of prevent from increase of thickness has been performed by arranging the shooting optical system in the end portion of the main body of the device and applying a layout in which the shooting optical system and various electric circuit board, and the image display sections, etc. are not overlapped in the main body of the device in the thickness direction.

As described above, conventionally, a method of bending the shooting optical system is known to thin the thickness of the device. However, thickness of device is not determined only by a physical size of the shooting optical system. Relative arrangement with the print circuit board or the image display section is an important element in the thickness of the device as previously described. In addition, it is also possible that portability and the operativeness of the device cannot be satisfied only with the device thin, and convenience worsens oppositely. Actually, a large restriction is caused in shape and the layout and there is a possibility that the disadvantage is brought up by operativeness etc., since the position of the shooting optical system is limited to a left end or a right end of the main body of the device and as a result, the camera becomes oblong to secure the area of the substrate, etc. When the shooting optical system is arranged in the end portion in the main body of the device so as not to be overlapped to the various electric circuit board and the image display section, etc., a similar disadvantage is occurred, even when the shooting optical system is incorporated in the main body of the device.

BRIEF SUMMARY OF THE INVENTION

An object of the present invention is to provide an electronic imaging device, which can achieve a thin main body of device and maintain well-balanced whole shape and excellent operativeness by considering an arrangement of the internal configuration component.

The first electronic imaging device, which performs a photoelectric-conversion of a subject light with an imaging element and records it, according to the present invention is characterized by comprising: a first lens arranged along a first optical axis to take a luminous flux from the subject; an optical axis conversion material which bends the luminous flux which passes the first lens along a second optical axis which intersects with the first optical axis; a second lens which images the luminous flux bent along the second optical axis to the imaging element arranged on the second optical axis; and an optical amount adjustment device provided between the imaging element and the optical axis conversion material. The preferred manners of the first electronic camera are as follows.

(1) The second lens and the imaging element are made in a unit.

(2) A plurality of imaging control materials to control an imaging operation; a first driving power giving material which gives a driving power to at least one of the imaging control materials; and a second driving power giving material which gives a driving power to a driving power giving material different from the first driving power giving material are further provided, and the first driving power giving material and the second driving power giving material are arranged in a first space and a second space divided by a planar which includes the first optical axis and the second optical axis, respectively.

(3) In (2), the imaging control material is provided between the imaging element and the optical axis conversion material and includes a movement mechanism which moves the second lens.

(4) In (3), the first driving power giving material and the second driving power giving material include an AF motor and a zoom motor, which perform an AF operation and a zooming operation by moving the second lens.

(5) The first lens and the optical axis conversion material construct a first unit, the second lens and the imaging element construct a second unit, and the first unit and the second unit construct a shooting lens unit.

(6) In (5), a flash unit arranged in parallel to the second optical axis is further provided.

(7) In (6), a power supply arranged in parallel to the second optical axis is further provided, and the flash unit is arranged between the shooting lens unit and the power supply.

(8) In (6), a power supply arranged in parallel to the second optical axis is further provided, and the shooting lens unit is arranged between the flash unit and the power supply.

(9) The light amount adjustment device includes an aperture shutter unit which performs a control of an aperture and a shutter at the same time.

(10) The imaging lens unit has a imaging element moving mechanism which moves the imaging elements along the second axis to an imaging surface.

The second electronic imaging device according to the present invention is characterized by comprising: an optical axis conversion material which bends a luminous flux along a second optical axis which intersects with a first optical axis after taking in a luminous flux from a subject through a lens arranged along the first optical axis; a lens group which images the luminous flux bent along the second optical axis to an imaging element arranged on the second optical axis; an imaging element which receives the luminous flux which passes the lens group and performs a photoelectric-conversion; an optical amount adjustment device provided between the imaging element and the optical axis conversion material; and display means which is arranged in a camera main body on a rear side of the optical axis conversion material, and displays a received signal with the imaging element as an image. With this configuration, a plurality of imaging control materials to control an imaging; a first driving power giving material which gives a driving power to at least one of the imaging control materials; and a second driving power giving material which gives a driving power to a driving power giving material different from the first driving power giving material are further provided, and the first driving power giving material and the second driving power giving material are arranged in a first space and a second space divided by a planar which includes the first optical axis and the second optical axis, respectively.

The third electronic camera according to the present invention is characterized by comprising: a shooting lens unit having a first lens unit which includes an optical axis conversion material which bends an incident luminous flux along a first optical axis, along a second optical axis which intersects with the first optical axis, and a second lens unit which includes a lens group which images the luminous flux bent along the second optical axis to the imaging element arranged on the second optical axis, and an optical amount adjustment device provided between and the optical axis conversion material to the imaging element; display means arranged on a rear side in a camera main body of the optical axis conversion material to display a received signal as an image with the imaging element; a power supply arranged in parallel to the second optical axis at a part section side in the camera main body; and a record medium storage room arranged adjacent to an end section side of the display means at a rear side of the power supply in the camera main body. The preferred manners of the third electronic camera are as follows.

(1) The record medium storage room is arranged in parallel to a planar which is a vertical planar which includes the first optical axis and the second optical axis.

(2) A circuit board which is parallel to a planar vertical to a planar which includes the first the optical axis and the second optical axis, and arranged in front of the display means is further provided.

(3) The display means is rotatably provided.

(4) An electric circuit board arranged between the imaging element and a bottom of the camera main body to chiefly mount the imaging circuit which processes an imaging signal of the imaging element is further provided.

(5) A protection cover which is arranged in a front section of the camera main body where the shooting lens unit is arranged, and is arranged movable between a cover position where shields the shooting lens unit and an open position where opens the shooting lens unit; and unnecessary external light shielding means which is provided to the front section of the main body of the camera and restricts the protection cover at the cover position are further provided.

(6) In (5), The unnecessary external light shielding means is formed outside of the camera main body in the convexity.

(7) The shooting lens unit has an imaging element movement mechanism which moves the imaging element along the second optical axis on the imaging surface.

The fourth electronic imaging device, which performs photoelectric-conversion of the subject light with an imaging element and records it, according to the present invention is characterized by comprising: a first unit having a first lens to take a luminous flux from the subject along a first optical axis, and an optical axis conversion material which bends the luminous flux which passes the first lens along a second optical axis which intersects with the first optical axis; a second unit having a first lens which images the luminous flux bent along the second optical axis arranged on the second optical axis on the imaging element; and an optical amount adjustment unit arranged to place between the first unit and the second unit, and the first unit, the second unit, and the light amount adjustment unit can mutually separated. The preferred manners of the fourth electronic camera are as follows.

(1) The light amount adjustment unit includes a shutter device or an aperture device.

(2) The light amount adjustment unit includes a shutter device or an aperture device, and a plurality of driving materials which drive the shutter device or the aperture device, respectively.

(3) The plurality of driving materials include a plurality of driving motors arranged along the second optical axis on the first unit side and the second unit side.

(4) The first unit comprises a third unit which includes the first lens and a fourth unit which includes the optical axis conversion material.

The fifth electronic camera according to the present invention is characterized by comprising: an imaging optical system which reflects a luminous flux which passes a first lens arranged along a first optical axis with a reflection material, bends it to a second lens direction arranged along a second optical axis, and images the luminous flux which passes the second lens to an imaging element arranged on the second optical axis; a first adjustment material which moves the imaging optical system to adjust a focus; a second adjustment material which moves the imaging optical system to perform a zoom adjustment; a third adjustment material which adjusts aperture; a fourth adjustment material which adjusts a shutter aperture; and a first driving power giving material to a fourth driving power giving material which give the driving power to the first adjustment material to the fourth adjustment material, respectively, and the first driving power giving material to the fourth driving power giving material are arranged separately at both sides of a plane which includes the first optical axis and the second optical axis. The preferred manners of the fifth electronic camera are as follows.

(1) The first adjustment material includes a guide axis which holds the first lens, the first driving power giving material is a motor arranged in parallel to the first optical axis, and the first lens moves on the guide axis by a driving power from the motor.

(2) The second driving power giving material is a motor arranged in parallel to the second optical axis.

(3) The third and the fourth adjustment materials are arranged between the reflection material and the second lens.

(4) The third and fourth adjustment materials are constructed to one body as one unit, and the first and second driving materials are provided to the unit.

The sixth electronic camera according to the present invention is characterized by comprising: an imaging optical system which reflects a luminous flux which passes a first lens arranged along a first optical axis with a reflection material, bends it to a second lens direction arranged along a second optical axis, and images the luminous flux which passes the second lens to an imaging element arranged on the second optical axis; an aperture adjustment material arranged between the reflection material and the second lens; a shutter aperture adjustment material which is arranged adjacent to an optical amount adjustment side of the aperture adjustment material; a first driving power giving material arranged to connect with the aperture adjustment material; and a second driving power giving material arranged to connect with the shutter aperture adjustment material, and the first driving power giving material and the second driving power giving material are arranged in a first space and a second space divided by a plane which includes the first optical axis and the second optical axis respectively.

The seventh electronic camera according to the present invention is characterized by comprising: an imaging optical system which reflects luminous flux which passes a first lens arranged along a first optical axis with the reflection material, bends it to the second lens direction arranged along the second optical axis, and images luminous flux which passes the second lens to the imaging element arranged on the second optical axis; a first adjustment material which moves the imaging optical system to adjust a focus; a second adjustment material which moves the imaging optical system to perform a zoom adjustment; a third adjustment material arranged between the reflection material and the second lens to adjust an aperture; a fourth adjustment material arranged adjacent to an optical amount adjustment side of the aperture adjustment material, to adjust a shutter aperture; and a first driving power giving material to a fourth driving power giving material which give driving powers respectively to the first adjustment material to the fourth adjustment material, and the first driving power giving material to the fourth driving power giving material is distributed and arranged in spaces formed by two planars of a first planar which includes the first optical axis and the second optical axis and a second planar which includes the light amount adjustment surface. With this configuration, the electronic imaging device has a shooting lens unit which is constructed by a first unit which includes the first lens, a second unit which includes the optical axis conversion means, and a third unit which includes the second lens and the imaging element; and a fourth unit which is provided between the second unit and the third unit and includes the first adjustment material and the second adjustment material, and the first driving power giving material to the fourth driving power giving material are connected with corresponding parts of the first unit to the fourth unit.

The eighth electronic camera according to the present invention is characterized by comprising: an imaging optical system which reflects a luminous flux which passes a first lens arranged along a first optical axis with a reflection material, bends it to a second lens direction arranged along a second optical axis, and images the luminous flux which passes the second lens to an imaging element arranged on the second optical axis; a first adjustment material which moves the imaging optical system to perform a zoom adjustment; a second adjustment material arranged between the reflection material and the second lens to adjust aperture; a third adjustment material arranged adjacent to an optical amount adjustment side of the aperture adjustment material, to adjust a shutter aperture; and a first driving power giving material to a third driving power giving material which give driving powers respectively to the first adjustment material to the third adjustment material, and the first driving power giving material to the third driving power giving material is arranged in one space among spaces divided by a planar which includes the first optical axis and the second optical axis. With this configuration, a shooting lens unit having a first unit which includes the first lens, a second unit which includes the optical axis conversion means, and a third unit which includes the second lens and the imaging element; and a fourth unit which is provided between the second unit and the third unit and includes the first adjustment material and the second adjustment material are further provided, and each of the first driving power giving material to fourth driving power giving material is connected with parts which correspond the first unit to the fourth unit.

As described above, according to the present invention, the shooting lens unit comprises the optical axis conversion means that converts directional of the shooting optical axis between lenses to bend the optical axis in the middle thereof, and the image display section is arranged in the rear surface of the shooting lens unit. As a result, the main body of the device does not thicken and an electronic imaging device of well-balanced not too long horizontal size can be achieved. In addition, by arranging the optical amount adjustment device after the optical axis conversion means, that is, after the optical axis is bended, it is possible to contribute to thinning the electronic imaging device.

Since the movement mechanism of the lens is arranged after the optical axis conversion material, it can make the shooting lens unit a high function with maintaining thinning the main body of the device.

In addition, since the electric circuit board is arranged parallel to the bottom surface of the main body and is arranged adjacent to the imaging element, deterioration of the imaging signal can be decreased, and the main body of the device can be thinned. Since the above-mentioned electric circuit board is arranged on the bottom side of the main body of the device, it is hardly influenced by the noise from other substrates.

Since the unnecessary external light shielding means is formed to be projected to the exterior section of the main body of the device, the shooting lens unit can be arranged nearer at front of the main body of the device. As a result, it becomes possible to thin the main body of the device.

In addition, since the shooting lens device for an electronic camera which constructs the bended optical system is constructed by the plurality of blocks which can be relatively positioned and fixed, or by assembling the unit, it becomes possible to improve productivity because manufacturing the shooting lens device becomes easy and a high optical performance can be maintained.

In addition, sine the driving materials of the operation means to perform the operation to the luminous flux, respectively, are arranged with well-balance, the space in the camera case can be used in validity.

By arranging the driving material of the operation means to perform the operation to luminous flux, respectively, together, it becomes possible to arrange the control wiring to this driving material efficiently.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 9 is a front view, which shows the electronic camera in which shooting lens device according to the fourth embodiment of present invention is built in;

FIGS. 12A to 12C are detailed figures of the shooting lens device, and respectively show the front views in which FIG. 12A shows a state to assemble all of the four units, FIG. 12B shows a state which decomposes into the first optical unit, an optical axis conversion unit, an optical amount adjustment unit, and the second optical unit, and FIG. 12C shows a state which decomposes into the first optical unit, an optical axis conversion unit, an optical amount adjustment unit, and the second optical unit;

FIGS. 14A to 14E are detailed figures of the shooting lens device, and respectively show the plan views in which FIG. 14A shows a state to assemble all of the four units, FIG. 14B shows a state to assemble the first optical unit and the optical axis conversion unit, FIG. 14C shows a state to assemble an optical amount adjustment unit and the second optical unit, FIG. 14D shows only an optical amount adjustment unit, and FIG. 14E shows only a second optical unit.

DETAILED DESCRIPTION OF THE INVENTION

Figure 1:
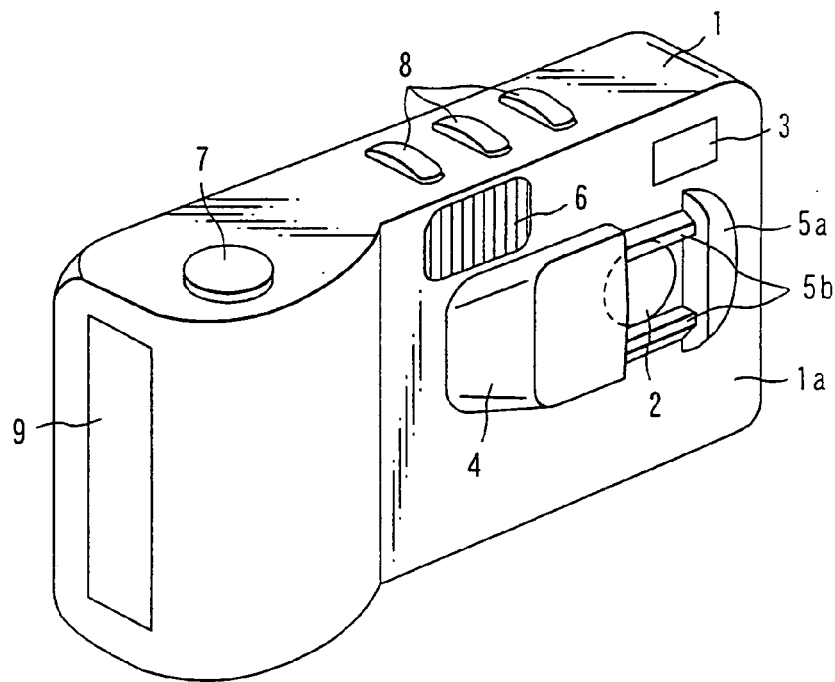
FIG. 1 is an external perspective view seen from the front side of an electronic imaging device according to the first embodiment of the present invention.

Next, the embodiments of the present invention will be explained referring to the drawings. FIG. 1 is an external perspective view seen from the front side of an electronic imaging device (hereafter, called as "electronic camera") according to the first embodiment of the present invention.

In this embodiment, the present invention is applied to an electronic camera, and the right and left direction is made the direction seen from the subject side, when explanation is not clearly described in the following explanations. In FIG. 1, aperture 2 of the shooting lens is arranged in right side of center thereof in front of front cover 1a (exterior section), which protects a front side of main body 1 of the electronic camera. And, a transparent window for optical viewfinder 3 for the subject visual check is arranged at an upper portion of this aperture 2 and at further the right side of camera main body 1, and, in addition, flash window 6 is arranged at the upper portion of the central section.

Optical viewfinder 3 comprises a plurality of optical components inside thereof, and, when shooting, the photographer can check subject visually through eyepiece window (not shown in the figure) provided to rear cover 1b (see FIG. 5B), which protects the rear side of camera main body 1. Flash window 6 is a transparent window and the xenon tube for the flash luminescence, which is controlled with the flash circuit installed in the main body is comprised in the inside and emits light. Lens protection cover 4 at a central section is provided in front of front cover 1a to a free sliding to the right and left, and covers, protects shooting lens aperture 2 when non-shooting, opens shooting lens aperture 2 when shooting, and enables the shooting. FIG. 1 shows the state that shooting lens protection cover 4 is opened. First salient 5a and second salients 5b formed on front cover 1a are constructed to a shape to surround shooting lens aperture 2, and the details will be explained in full referring to FIG. 2A and FIG. 2B.

Camera main body 1 has a shape in which the left side seen from the front side is swelled compared with at the right thereof in the thickness direction. The swelling part becomes the holding section for photographer, when shooting by the camera, and camera main body 1 can be stably held. Cover 9 for the external memory detaching is provided to the left end of camera main body 1 which is in a part of the holding section, and cover 9 is rotatably arranged to camera main body 1. FIG. 1 shows the state to close cover 9. In the state to close cover 9, the surface of the outside of cover 9 is constructed to become the same plane as the surface of the outside of camera main body 1 which constructs the holding section. The switch for the camera operation is provided on camera main body 1. Release switch 7 is a switch, which records the image in the memory when shooting, and mode switch 8 is a switch for the switch of the record mode when shooting.

Figure 2A:
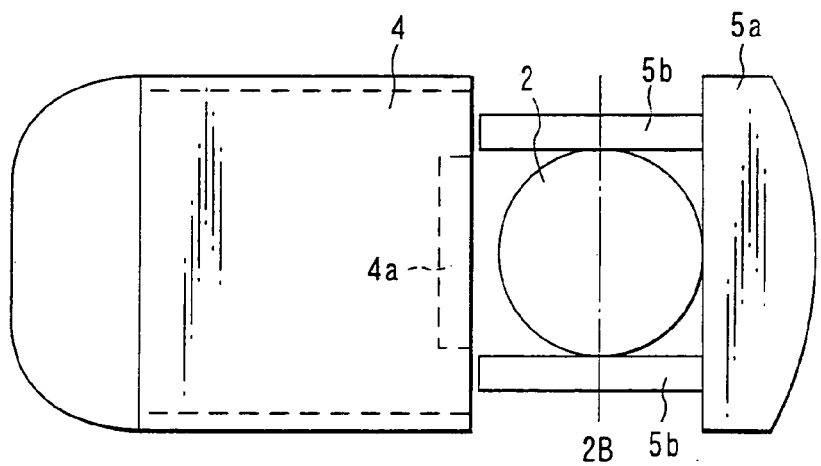
FIGS. 2A and 2B are a front view and a sectional view, which show the vicinity of the shooting lens aperture in the first embodiment shown in FIG. 1, in detail.
Figure 2B:
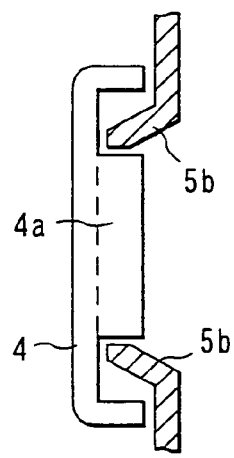

FIG. 2A is a front view, which shows the vicinity of shooting lens aperture 2 in the state to open shooting lens protection cover 4 in detail. FIG. 2B is a main part sectional view, which sees the section along 2B—2B line in the vicinity of the center of shooting lens aperture 2 from a right side.

Shooting lens aperture 2 has the following configurations to shut out diagonally incident unnecessary light (that is, optical excluding the subject light) from aperture 2 of the shooting lens. First salient 5a, which projects at the right of shooting lens aperture 2 from the front side of front cover 1a, is provided. And, a pair of the second salients 5b is provided in the top and bottom surface of shooting lens aperture 2. And, when shooting lens protection cover 4 is opened when shooting, wall portion 4a installed in the end portion of shooting lens protection cover 4 is located at the left of shooting lens aperture 2. With this configuration, salients 5a, 5b, and wall portion 4a, which surround this shooting lens aperture 2, prevent harmful light from entering, which is not incident subject light essentially, to shooting lens unit 11 from the diagonal for camera main body 1. As a result, the flare ghost can be easily prevented without requiring special shading. Though the same effect can be achieved if a cylindrical hood etc. is formed to front cover 1a, in this case, it is disadvantageous for miniaturization, since the amount of movement of shooting lens protection cover 4 in the opening direction should be increased to exceed the hood. Since the prevention effect of the flare ghost is achieved even when the position of opening shooting lens protection cover 4 is moved only to a very limit position of shooting lens aperture 2, and the cylindrical hood etc. can be formed independently by wall portion 4a formed to the end portion of protection cover 4, it is advantageous for the miniaturization in this embodiment.

Figure 3A:
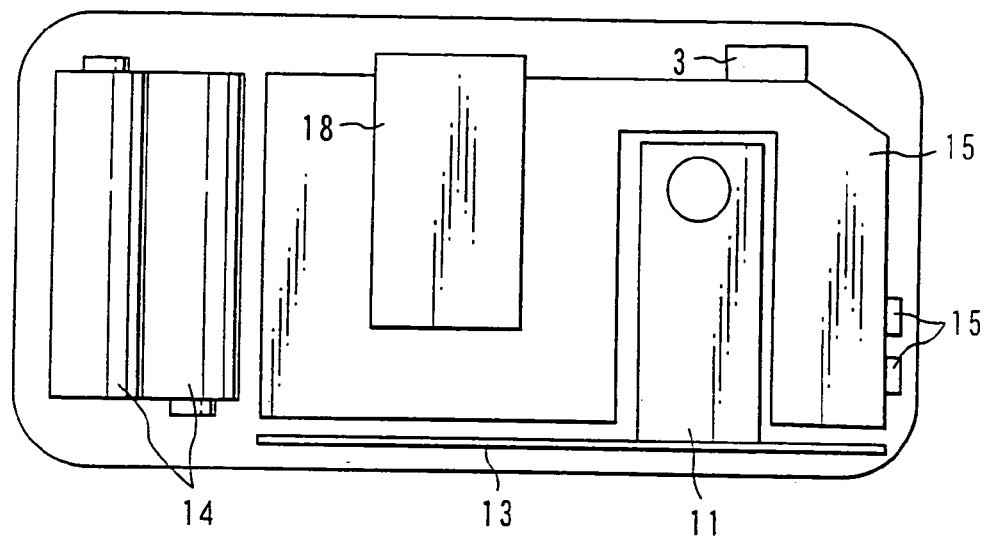
FIGS. 3A to 3C are figures, which show the internal layouts in the first embodiment shown in FIG. 1.
Figure 3B:
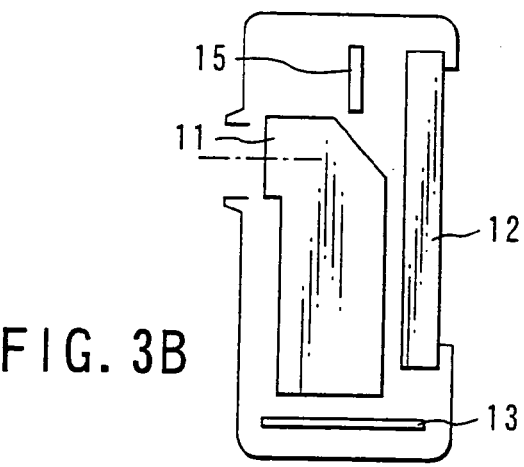
Figure 3C:
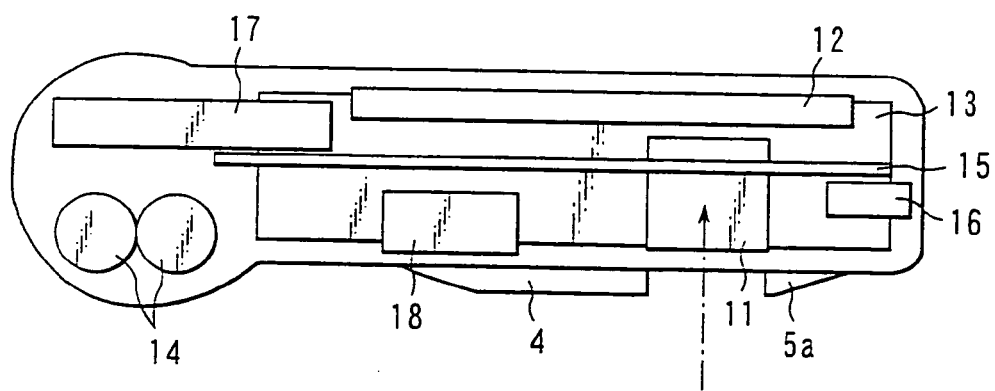

FIGS. 3A to 3C are figures, which show the internal layouts of the electronic camera of the first embodiment shown by FIG. 1, and are layouts of an internal main component in which FIG. 3A is a front view, FIG. 3B is a right side view and FIG. 3C is the upper surface view, respectively.

Shooting lens unit 11 has a rectangular shape and is arranged at right side of the center of the camera main body, and longer side thereof is arranged vertical to the bottom surface of the camera main body. Shooting lens unit 11 comprises a plurality of lenses and optical components to image the subject image, and the imaging element, which performs a photoelectric-conversion, at the imaging surface, and the detailed configuration will be explained later referring to FIGS. 5A and 5B. Imaging substrate 13 is the electric circuit board to which the imaging circuit, which performs the processing of an electric signal into which the photoelectron is converted with the driving control of the imaging element and the imaging element etc., is chiefly mounted, and is arranged parallel to the bottom surface of the camera main body under shooting lens unit 11. Main substrate 15 is arranged parallel to the front surface of the camera main body. Main substrate 15 comprises the main CPU which processes the entire system, the compression expansion processing circuit of the image signal, the control circuit which controls the driving of motors comprised to the shooting lens system described later, detaching memory storage room 17 which incorporates connector for detaching memory, and the interface circuit and I/O terminal 16, etc.

Said detaching memory storage room 17 is mounted on the end portion of the rear side of main substrate 15, and the memory insertion entrance of detaching memory storage room 17 is arranged to the position corresponding to cover 9 installed on a left side of FIG. 1. The detaching memory mounts the flash memory inside thereof, and a so-called card type of flatness or a cylindrical shape stick type is acceptable. Wires are unnecessary by directly mounting detaching memory storage room 17 on the rear side of main substrate 15, to improve the internal layout efficiency. I/O terminal 16 consists of the signal terminal which exchanges the image signal to an external equipment, and the plurality of terminal such as external power supply terminals to supply the driving power supply of the camera from the outside, and an aperture (not shown), which inserts the cable corresponding to the terminal position, is provided to a right side of the main body exterior. Since I/O terminal 16 is mounted directly on main substrate 15, wiring can be omitted, and the layout efficiency is raised.

Battery 14 supplies the power supply to an electronic camera. Battery 14 is stored in the holding section at a left side of camera main body 1, is arranged at a front side of detaching memory storage room 17, and is vertically arranged to the bottom surface of camera main body 1. The opening and shutting cover for the battery exchange is arranged in the bottom (not shown). Image display section 12 is used as a reproduction display of the recorded image and an electronic viewfinder when shooting. This image display section 12 is constructed by the liquid crystal and the plasma display, etc., and the display surface is provided to the rear surface of the main body so that the photographer etc. may use it easily. This image display section 12 is provided between shooting lens unit 11 and rear cover 1b of camera main body 1 (see FIG. 5B), and arranged at the position which is not overlapped in directional of thickness of detaching memory storage room 17 and camera main body 1. And, the image display side is exposed directly from the opening installed in rear cover 1b without installing the protection glass etc. in the aperture of rear cover 1b, then camera main body 1 is thinned. Flash unit 18 is constructed by the xenon tube arranged inside thereof in above-mentioned flash window 6 and the capacitor for the control circuit section and the charge etc. which emitting light control this. And, this flash unit 18 is arranged between shooting lens unit 11 in the front surface of main substrate 15 and battery 14 by the direction which is the longer side direction thereof and parallel to shooting lens unit 11.

Figure 4A:
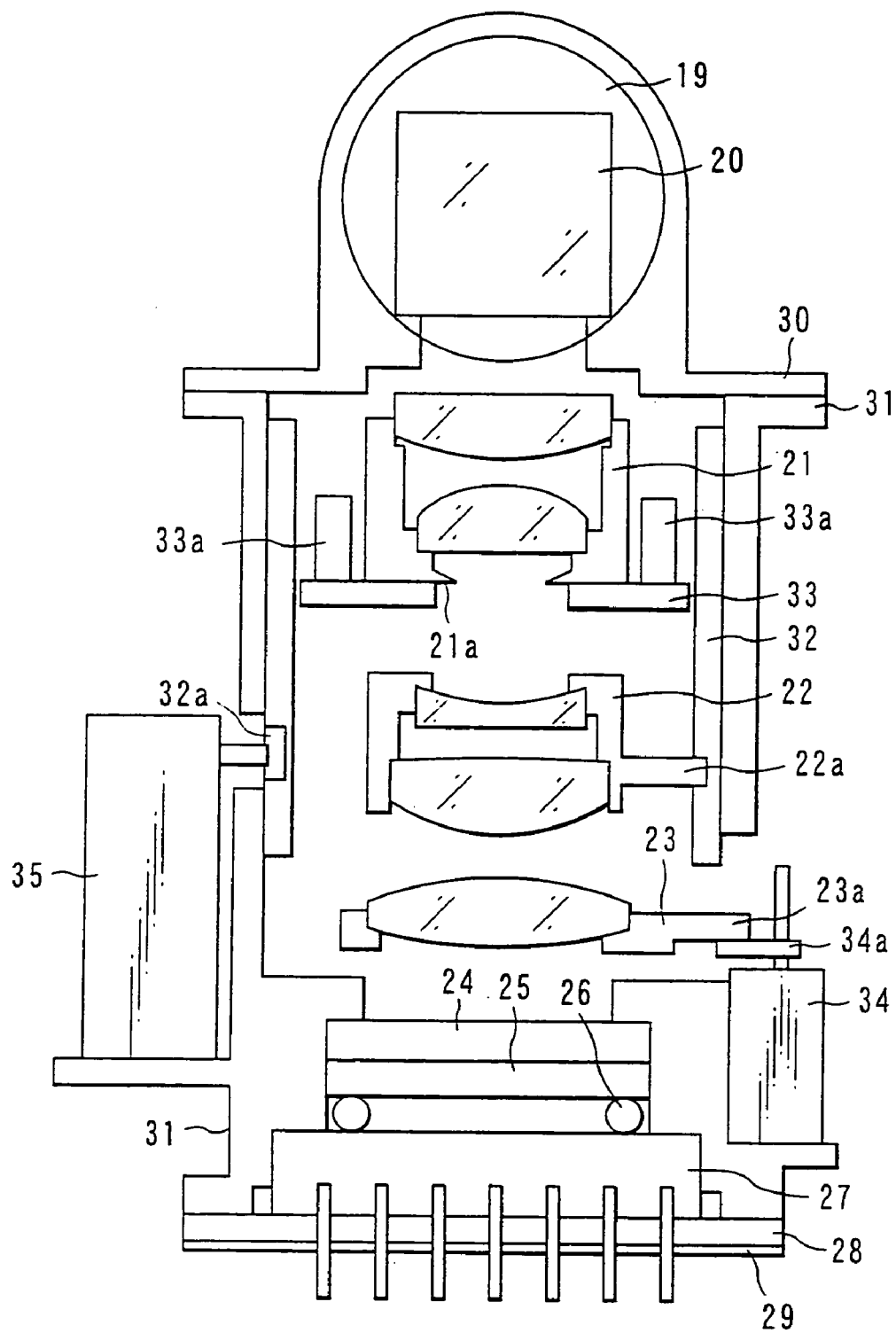
FIGS. 4A and 4B are the main part sectional views on front and side of the shooting lens unit in the first embodiment shown in FIG. 1.
Figure 4B:
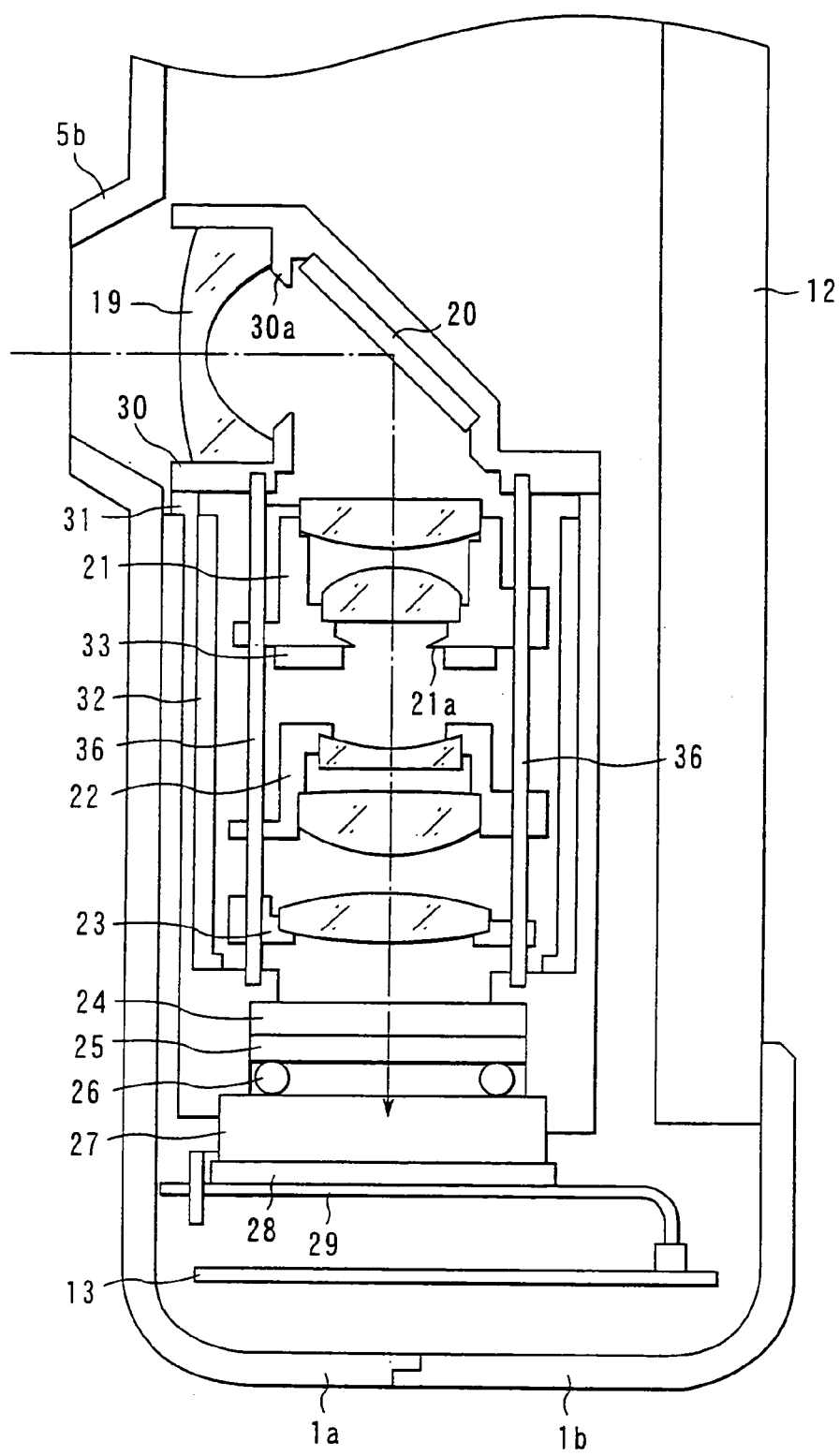

FIG. 4A and FIG. 4B are figures, which show the detailed configuration of shooting lens unit 11, FIG. 4A is a main part sectional view in the front side, and FIG. 4B is a main part sectional view on a right side.

Front fixed frame 30 holds first group lens 19, which is the nearest part to the subject, and reflection-mirror 20. Cover material 30a which intercepts harmful light which enters and passes first group lens 19 from the diagonal, not to be entered reflection mirror 20 between first group lens 19 and reflection mirror 20 is formed to front fixed frame 30. This cover material 30a is formed in the extension part of the receiving section of first group lens 19, and formed to the wedge shape, which narrows toward reflection mirror 20. Reflection mirror 20, which is the shooting optical axis conversion means, is a thin plate and is a rectangle. The shooting optical axis, which enters vertically in the front surface of the camera main body and passes first group lens 19, reflects with reflection mirror 20, is bent by 90°, and, is changed to the direction of the bottom surface of camera main body 1. A flange section is formed substantially parallel to the bottom surface of camera main body 1 under front fixed frame 30, and the installation section of engagement section which engages with the points of two guide shafts 36 described later and rear fixed frame 31 described later similarly is formed in this flange section.

As for second group lens frame 21, both sides thereof are opened and has inside thereof is cylindrical shape, and comprises the flange section in part of the circumference. Two lenses are comprised in the cylinder thereof and fixed aperture 21a is formed in the vicinity of one aperture edge in the cylinder. The engagement section which engages with two guide shafts 36 to support second group lens frame 21 to be movable only to the optical axis direction and the cam pin (not shown) for positioning the optical axis direction are formed in the above-mentioned flange section of second group lens frame 21. Iris shutter unit 33 is fixed and arranged in the vicinity of fixed aperture 21a of second group lens frame 21. Iris shutter unit 33 is a device, which mechanically adjusts an optical amount which reaches the imaging element, and is comprised so that the aperture blade and the shutter blade become free movement respectively on an optical path in the main body of the disk shape. The driving of the aperture blade and the shutter blade are performed by independent driving source 33a provided outside of the main body of the disk shape, respectively.

As for third group lens frame 22, both sides thereof are opened and has inside thereof is cylindrical shape, and comprises the flange section in part of the circumference as well as second group lens frame 21. Two lenses are comprised in the cylinder, and the engagement section which engages with two guide shafts 36 to support third group lens frame 22 which can be moved only to the optical axis direction and cam pin 22a for positioning in the optical axis direction are formed to the flange section. Fourth group lens frame 23 is disk shape with hollowness, holds one lens inside thereof, and, as well as second group lens frame 21, the engagement section which engages with two guide shafts 36 to support fourth group lens frame 23 which can be moved only to the optical axis direction and end portion 23a for the position restriction to the optical axis direction are formed.

Rear fixed frame 31 has substantially cylindrical shape, and is arranged so that the longer side may become vertical to the bottom surface of camera main body 1. And, a lens storage section of upper portion and the storage section of lower imaging element etc. are chiefly formed inside the device, and is partitioned in part by the flange section which is formed in the middle thereof. Two guide shafts 36, which support the above-mentioned each group lens frame with movable to the optical axis direction, are arranged in the cylinder flange section vertical to the direction of the bottom surface. Above-mentioned second group lens frame 21, third group lens frame 22, and fourth group lens frame 23 are sequentially arranged in order thereof in the cylinder through this guide shaft 36 to be movable only in the optical axis direction. Fourth group lens frame 23 connects with rear fixed frame 31 by the spring (not shown) in rear fixed frame 31, and is always pressed to the direction of the camera main body bottom.

In the storage section of the imaging element etc. partitioned by the flange section of back, fixed frame 31, low-pass filter 24 for moire prevention of monotony, IR cutting filter 25 which cuts infrared ray component with similarly planar shape, elasticity material 26 for displacement absorption which consists of rubber material in for example, and, imaging element 27 are sequentially arranged from the above. As for low-pass filter 24 and IR cutting filter 25, the planar side is arranged substantially parallel to the bottom surface of the camera main body and the imaging surface of imaging element 27 is also arranged substantially parallel to the bottom surface. And, fixed plate 28 is fixed to rear fixed frame 31 with the screw etc. while pushing the rear surface of the package side of imaging element 27. As a result, low-pass filter 24, IR cutting filter 25, and imaging element 27 are stably held by the elasticity power of elasticity material 26 in the storage section of the imaging element etc. In addition, flexible cable 29, which electrically connects imaging element 27 with camera main body section, is mounted at the terminal of imaging element 27, and one side of the flexible cable is fixed to fixation plate 28 by both sides tapes, etc. And, another end of flexible cable 29 is connected with the connector mounted on imaging substrate 13.

The lens movement mechanism consists of the zoom section and the AF section. Cam cylinder 32 is a cylinder cam to move second group lens frame 21 and third group lens frame 22 in the lens movement mechanism, is arranged in a cylindrical lens storage section of rear fixed frame 31, and rotates and slides in the inner wall of the lens storage section. And, second group lens frame 21 and gear section 32a of third group lens frame 22 to be moved for the cam trench and the driving are formed in the circumference section of this cam cylinder 32, respectively. Cam pin of second group lens frame 21 (not shown) and the cam pin 22a of third group lens frame 22 engages with the cam trench. Above-mentioned cam cylinder 32 is turned by zoom motor 35. Above-mentioned zoom motor 35 is fixed and arranged at a left section of shooting lens unit 11 outside of rear fixed frame 31, and comprises the deceleration mechanism section for the zoom driving. And, the output gear of zoom motor 35 engages with gear section 32a of the cam cylinder 32.

AF motor 34 for the focus adjustment is similarly one of the driving sources of the lens movement mechanism, and is arranged in a right section of shooting lens unit 11 which is the opposing side of zoom motor 35 outside of rear fixed frame 31. Lead screw is formed to the output axis of AF motor 34, and moving plate 34a is combined with the lead screw axis and can be moved only in the straight advancement movement by the restriction means not shown in the figure. And, end portion 23a of fourth group lens frame 23 is connected with moving plate 34a. Since zoom motor 35 and AF motor 34 are arranged at the position distributed right and left so as not to be overlapped with both image display sections 12 and directional of thickness in camera main body 1, it is convenient to thin the camera main body. An electric position detection sensor etc., which detect an initial position etc. of driving source 33a of aperture shutter unit 33, AF motor 34, zoom motor 35, and each lens group, are connected with main substrate 15 with the flexible cable not shown in the figure.

Next, the movement of each lens group will be briefly explained. Zoom motor 35 rotates with the zoom operation of the operator, and cam cylinder 32 turns through gear section 32a when zooming. Since second group lens frame 21 and third group lens frame 22 are restricted to move only to the optical axis direction with guide shafts 36, second group lens frame 21 and third group lens frame 22 are moved to the predetermined position in the optical axis direction according to the turn angle of cam cylinder 32 through each cam pin which engages with the cam trench formed to cam cylinder 32. AF motor 34 rotates by synchronization of the zoom movement of second group lens frame 21 and third group lens frame 22, or the operation operator, and moving plate 34a, to which only the translational movement is permitted, is moved to the optical axis direction according to the rotation of lead screw at AF. And, since fourth group lens frame 23 is always pushed to the direction of imaging element 27 and contacted with moving plate 34*a* through end portion 23*a*, positioning according to moving plate 34*a* is performed.

In the above-mentioned embodiment, it is explained by the configuration where the adjustment of AF is achieved by the lens movement, but, of course, imaging element 27 may be moved to the optical axis direction and focused instead of fourth group lens frame 23. In this case, fourth group lens frame 23 is fixed and arranged in the lens storage section of rear fixed frame 31, and imaging element 27 stored in the storage section for the imaging element etc. of rear fixed frame 31 is stored in the hold body besides rear fixed frame 31. And, this hold body is constructed to be moved to the optical axis direction to combine AF motors 34 with two guide shafts 36 and lead screw as well as the movement of the fourth the lens frame 23. In this case, since low-pass filter 24 and IR cutting filter 25 need not be moved, and are held by fixed plate 28 in the storage section of rear fixed frame 31. AF motor 34 is similarly fixed to rear fixed frame 31. As mentioned above, since the structure of the shooting lens system becomes simple and using the AF corresponding device and the fixed focus machine properly becomes easy when the optical axis directional movement means of the imaging element is installed like this and AF is adjusted, it becomes easy to vary the main body model.

Though the example in which fixed aperture 21*a* and the second lens frame 21 are formed is shown in the first embodiment, it is also possible to provide a fixed aperture to reflection mirror 20 as another example. Specifically, it can be easily achieved by forming the metal film to the reflection side by the print and the coating and attaching black thin plate in which a central section put an aperture. Since the surface of reflection mirror 20 is flat, it is easy to provide a fixed aperture compared with the lens with the curved surface. It is also possible to use the reflection mirror which coats the film for the infrared rays cutting, and, of course, becomes unnecessary in this case IR cutting filter 20. Reflection mirror 20 can be substituted with prism.

In the first above-mentioned embodiment, flash unit 18 is arranged between shooting lens unit 11 and battery 14, but various layouts may be possible without limiting to such a layout. For example, a layout in which the position of shooting lens unit 11 and flash unit 18 is replaced may be possible. In this case, the shapes of the substrate etc. are somewhat different, but the configuration of the above-mentioned embodiment may be basically usable almost as it is.

Figure 5A:
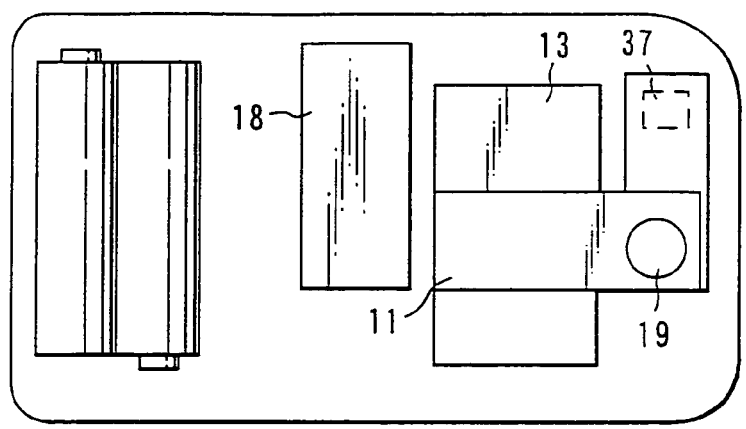
FIGS. 5A to 5C are figures, which show the internal layouts in the second embodiment of present invention.
Figure 5B:
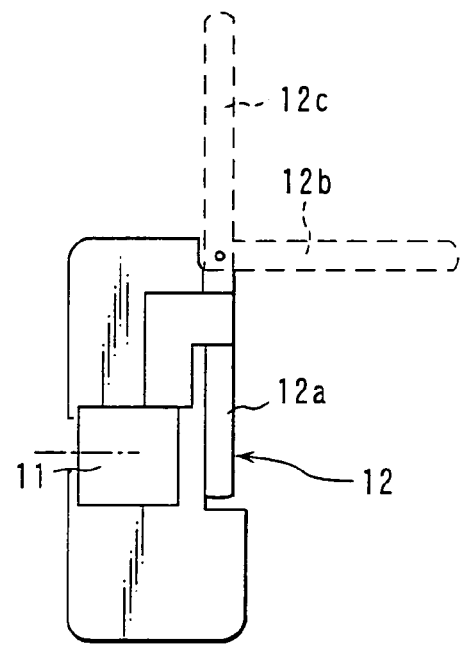
Figure 5C:
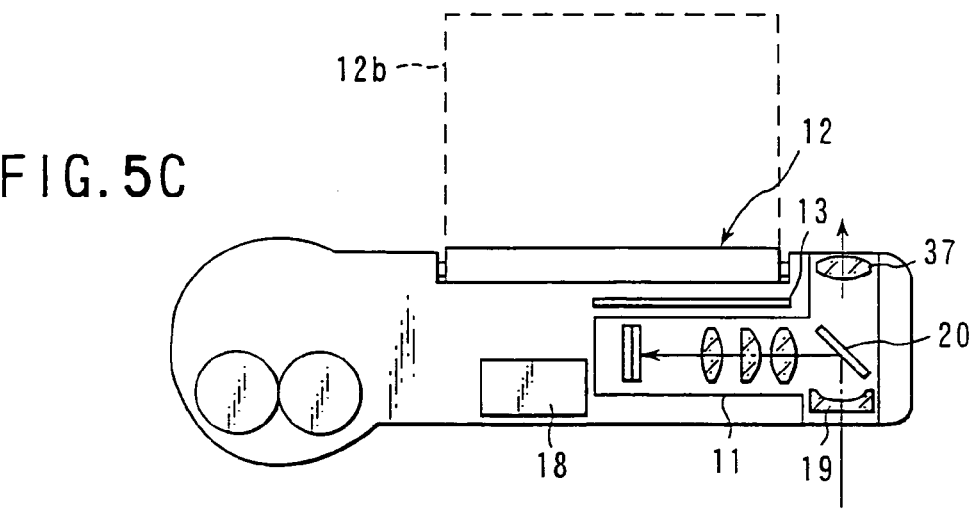

Next, the second embodiment will be explained referring to FIG. 5A to FIG. 5C. FIG. 5A to FIG. 5C are layouts which show shooting lens unit 11 and image display section 12, etc. from the front side, the upper surface, and a right side, respectively. Reflection mirror 20 is arranged in shooting lens unit 11 inside thereof as well as the first embodiment, and the incidence light is bent by 90°. And, shooting lens unit 11 is arranged in the camera main body such that the bent shooting optical axis is parallel to the bottom and the rear surface of camera main body 1. Shooting lens unit 11 is laid out in the main body in which first group lens 19 is located in the vicinity of the main body right end. This reason is that it is not easy to use it in validity, since some space can be secured at right and left of shooting lens unit 11, but enough space cannot be secured when shooting lens unit 11 is in a central section of main body 1 of the camera, and the optical viewfinder can be arranged in the vicinity of the right end when the first group lens 19 is on a right end, and the vicinity of a main body central section can be used in validity. As a result, since the longer side direction of shooting lens unit 11 is arranged parallel to the bottom surface, the thickness of the camera main body can be thinned, and the height thereof can be lowered.

In addition, reflection mirror 20 consists of the half mirror, and divides the ray, which passes first group lens 19, into two. The reflection ray reaches the imaging element by passing the lens for each imaging as well as the first embodiment. To use the transmission ray as a ray for the optical viewfinder, each lens for the optical viewfinder is arranged in the rear surface of reflection mirror 20, which is the half mirror (not shown). The subject image, which passes each lens, is observed from eyepiece section 37 provided at rear cover 1*b*. Since the optical viewfinder of the single lens reflex can be constructed by using reflection mirror 20 in shooting lens unit 11, the viewfinder image, which is not parallax, maintaining thin type, is obtained.

Reflection mirror 20 is properly turned except that the subject light is divided into two with the half mirror (beam splitter) and it is also possible to change directional of the subject light. Reflection mirror 20 is constructed by a usual reflection type, which is not the half mirror, and is constructed that a right end of reflection mirror 20 in clockwise about 45° is a turn center in FIG. 5C, and for example, with rotatable by the motor etc. And, the subject light usually enters only the optical viewfinder system by saving reflection mirror 20 from the luminous flux of the subject light by setting to the position which turned by 45°, and the photographer decides the composition etc. while observing subject with eyepiece section 37. Next, reflection mirror 20 automatically turns to counterclockwise 45° when release switch 7 is pushed, the subject light is led to the imaging element side, and the shooting record is done through the operation such as AF·AE. As described above, by constructing to switch the angle of reflection mirror 20 and to lead the subject light to the imaging element only at the time of the shooting momentarily without dividing the subject light into two, the viewfinder image without the parallax is obtained, there is no decrease in an optical amount to the imaging element, and the shooting image of the amount high picture quality can be obtained.

The imaging circuit, which performs the processing of an electric signal which is preformed photoelectric-conversion with the driving control of the imaging element and the imaging element etc., is chiefly mounted on imaging substrate 13, and is arranged parallel to the rear surface of the camera main body between shooting lens unit 11 and image display section 12. Image display section 12 fixed in the main body in the first embodiment is constructed to be rotatable. That is, image display section 12 is arranged outside of cover 1*b*, and rotatable with the turning shaft provided right and left, and image display section 12 turns freely by about 180° between usual position 12*a* which is made to stick to cover 1*b*, horizontal position 12*b* where the image display side is parallel to the main body bottom, and inversion position 12*c* where the image display side becomes a subject side.

And, when the photographer uses the image display section as an electronic viewfinder at shooting, there is a disadvantage of not seeing well if eyes are not separated from the main body to some degree at usual position 12*a*, and it differs from the optical viewfinder. As a result, it causes the hand blur at telescopic mode and a low-speed shutter since sideward of the arm, which grips the camera opens and the hold of the camera becomes loose. It is hard to cause a hand blur since sideward of the state to separate eyes from the camera main body shuts, when the image display side is held and shot at horizontal position 12b at the waist level at telescopic mode and a low-speed shutter. When subject at a position, here is near ground and is low is shot, this horizontal position 12b is of course valid. By constructing that the universe of the image on the image display side is automatically reversed and displayed by detecting the turn angle of the image display section and at inversion position 12c, for example, when the photographer turns the camera to oneself and his or her face is shot, it is possible to shoot easily while seeing the image display side.

Figure 6A:
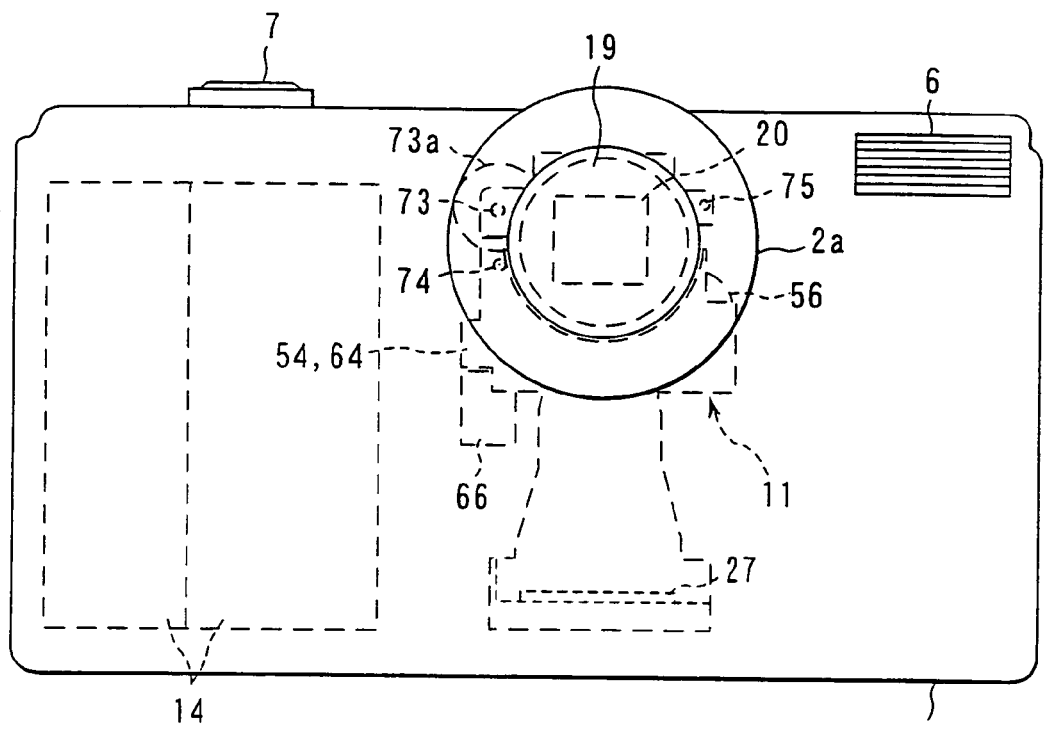
FIGS. 6A and 6B are a front view and a plan view, which show the electronic camera in which the shooting lens device according to the third embodiment of present invention is built in, respectively.
Figure 6B:
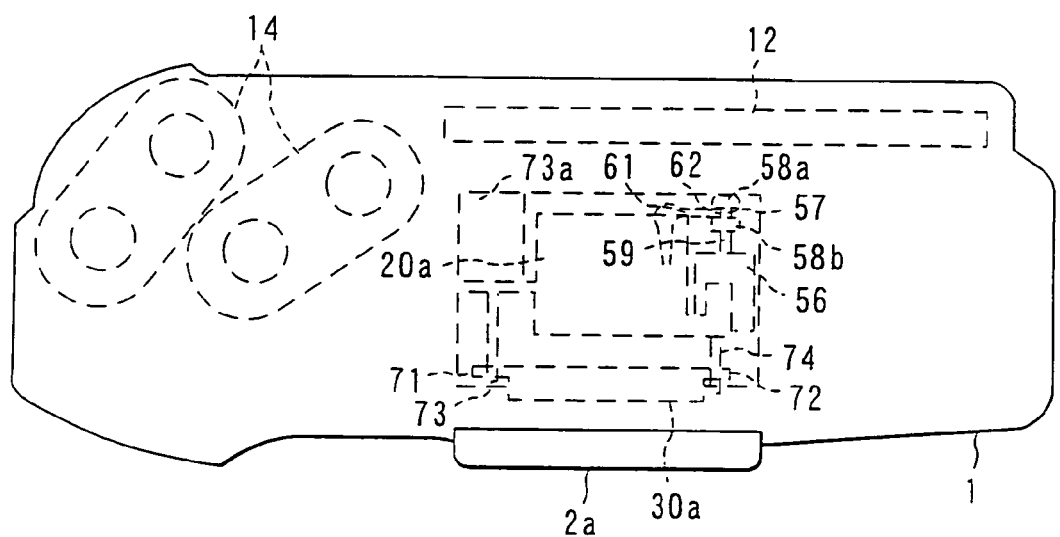

The third embodiment of the present invention will be explained referring to the drawings. FIG. 6A and FIG. 6B are front view and plan view which show an electronic camera which builds in the shooting lens device according to the third embodiment of the present invention, respectively. A basic configuration is similar to the first embodiment but the third embodiment has partly changed the configuration and the layout with the first embodiment.

Operation ring 2a and flash window 6 of the optical system are set on the front side of main body 1 of the electronic camera as shown in FIG. 6A and FIG. 6B, and release switch 7 is set in the upper part. Image display section 12 is set on the rear side of main body 1 of the electronic camera, and this is used to display the shot image and the reproduction image on the rear surface of main body 1 of the electronic camera. In addition, battery 14, which becomes the power supply of an internal system, is arranged in the left side of main body 1 of the electronic camera.

Figure 7:
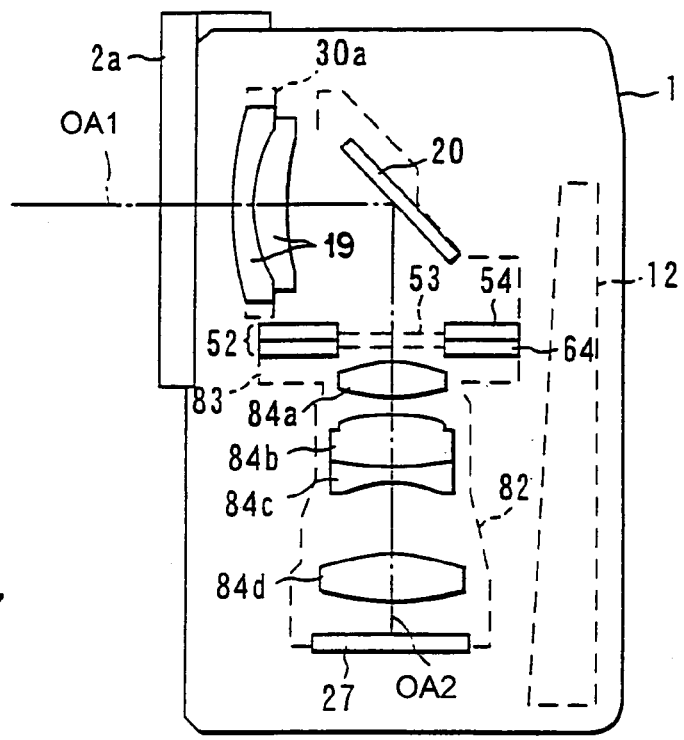
FIG. 7 is a side view, which shows the inside of the electronic camera and the optical system of the shooting lens device shown in FIG. 6A.
Figure 8:
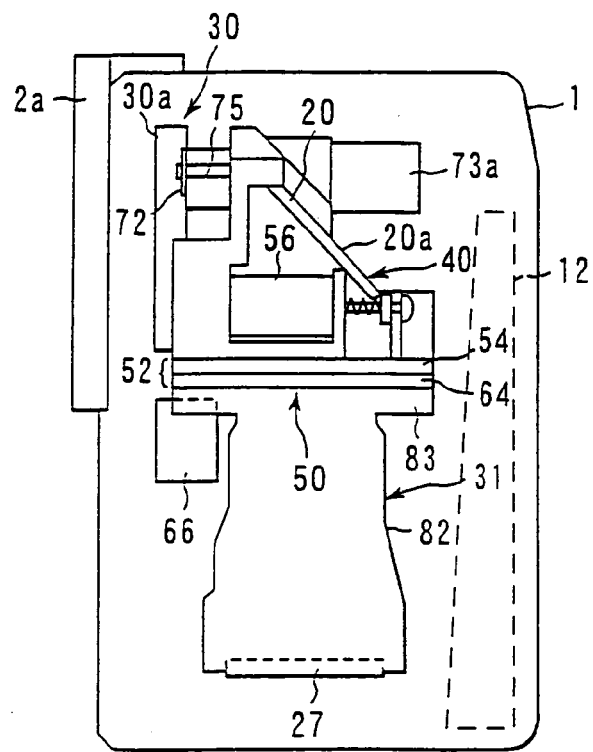
FIG. 8 is a side view, which shows the inside of the electronic camera and the outline of the shooting lens device shown in FIG. 6A.

Shooting lens unit 11 is set in main body 1 of the electronic camera as the optical axis to take luminous flux from subject into the center of operation ring 2a is coincide. FIG. 7 is a side view, which shows the optical system of the inside of the electronic camera shown in FIG. 6A and shooting lens unit 11, and FIG. 8 is a side view, which shows the outline of the inside of the electronic camera shown in FIG. 6A and shooting lens unit 11.

As shown in FIG. 7, shooting lens unit 11 takes luminous flux from subject from first group lens 19 along the first horizontal optical axis OA1, and constructs the bended optical system, which images it to the photoelectric conversion imaging element of imaging element 27 etc., after bending this by 90° by the optical axis conversion means such as reflection mirrors 20 along the second vertical optical axis OA2. As shown in FIG. 8, this shooting lens unit 11 is constructed by assembling front fixed frame 30, optical axis conversion unit 40, optical amount adjustment unit 50, and back fixed frame 31 generated as a mutually distinct unit.

Front fixed frame 30 has ring-shaped front mirror frame 30a, and first group lens 19 is fixed to front mirror frame 30a (see FIG. 7). The first group lens 19 is arranged to take in the luminous flux from the subject along first optical axis OA1 (which is directed in the horizontal direction).

Flanges 71 and 72 are attached to both sides of front mirror frame 30a, respectively (see FIG. 6B), the female screw section and the bearing hole are set to flange 71 at the top and bottom, and the bearing hole is set in flange 72. These flanges 71 and 72 are installed on horizontal screw shaft 73 set in optical axis conversion unit 40 by the following modes, two guide shafts 74 and 75 (see FIG. 6A), as a result, front fixed frame 30 can be movably held to optical axis conversion unit 40.

Optical axis conversion unit 40 has mirror frame 20a which forms the inclined plane with 45° for the second optical axis OA1, and OA2 of the first shooting lens unit 11.

Reflection mirror 20, which is the reflection means, that is, the optical axis conversion means, is bonded to these 45° inclined plane of mirror frame 20a (see FIG. 8). Luminous flux, which passes first group lens 19, is reflected with reflection mirror 20, and is bent along second optical axis OA2 (directed to vertical direction) by 90°.

Rotation motor 73a for AF (auto focus) is set in optical axis conversion unit 40 (see FIG. 6B and FIG. 8). Screw shaft 73 of AF motor 73a is extended in parallel to first optical axis OA1, the male screw section in the point is connected with the female screw section set in the upper part of flange 71 of front mirror section 30a of front fixed frame 30. Therefore, front mirror frame 30a is moved back and forth according to the rotation of shaft 35. Two parallel guide shafts 74 and 75 are set in optical axis conversion unit 40 for first optical axis OA1, and these are inserted and passed respectively into the bearing hole set in corresponding flanges 71 and 72 of front mirror frame 30a. That is, front mirror frame 30a is moved in parallel to first optical axis OA1 with first group lens 19 by the driving of AF motor 73a according to shafts 74 and 75, and, as a result, the focus adjustment is performed.

The connection means (not shown in the figure) to fix optical axis conversion unit 40 to the predetermined position on rear fixed frame 31 is set under mirror frame 20a.

Optical amount adjustment unit 50 has smooth frame 52 in which aperture 53 to pass the luminous flux bent with reflection mirror 20 according to the second optical axis OA2 is formed (see FIG. 7 and FIG. 8). To open and shut aperture 53 and adjust the area of an aperture, shutter means 54 and iris means 64 are set in frame 52. Plunger 56 is set in the upper part of frame 52 to drive shutter means 54, while stepping motor 66 is set under frame 52 to drive iris means 64.

Shutter means 54 is constructed to open and shut shutter along with the rotation of L type rotation lever 62 which is shafted in the rotatably by frame 52 centering on axis 61 (see FIG. 6B). The other arm of rotation lever 62 is connected with shutter means 54, and the other arm is placed between flange 58a and 58b the couple-installed on iron core 57 of plunger 56. Plunger 56 of shutter means 54 consists of the solenoid coil, which moves iron core 57 to back and forth at high speed. Coil spring 59 is installed in iron core 57 between motor and flange 58b. Therefore, rotation lever 62 is rotated by the high-speed reciprocation of iron core 57 of plunger 56, and, as a result, shutter means 54 is opened and shut.

The connection means (not shown in the figure) to fix optical amount adjustment unit 50 to the predetermined position on rear fixed frame 31 is set in frame 52 of optical amount adjustment unit 50.

Rear fixed frame 31 has mirror frame 82 in the camera case after the cylinder installed on 12, and the second group lenses 84a to 84d are fixed in rear mirror frame 82 (see FIG. 7). The second group lenses 84a to 84d are arranged for the photoelectric conversion imaging element, that is, imaging element 27 to image luminous flux, which is reflected with reflection mirror 20 along the second optical axis OA2 (vertical direction) and passes aperture 53 of optical amount adjustment unit 50.

Flat upper frame 83, in which an aperture (not shown in the figure) for the top section of rear mirror frame 82 to pass the luminous flux bent with reflection mirror 20 along the second optical axis OA2 is formed, is set (see FIG. 8). The connection means (not shown in the figure) to fix optical axis conversion unit 40 and optical amount adjustment unit 50 to the predetermined position on rear fixed frame 31 is set on upper frame 83.

AF motor 73a and motor 66 for the iris means and plunger 56 for the shutter means are arranged on both sides of the planar which includes first optical axis OA1 and second optical axis OA2 while assembled for shooting lens unit 11 shown in FIG. 6A. AF motor 73a and plunger 56 for the shutter means and motor 66 for the iris means are arranged to place at the optical amount adjustment side (shutter side and iris respect) provided by the optical amount adjustment means (shutter means 54 and iris means 64) between each other. In other words, AF motor 73a and plunger 56 for the shutter means and motor 66 for the iris means are arranged in three spaces among four spaces divided by a planar provided by first optical axis OA1 and second optical axis OA2, the optical amount adjustment side provided by optical amount adjustment means 54 and 64.

Reflection mirror 20 can be reduced since shutter means 54 and iris means 64 are arranged in the vicinity of reflection mirror 20, which is the optical axis conversion means. In consideration of this respect, AF motor 73a and plunger 56 for the shutter means are shifted from the plane provided by first optical axis OA1 and second optical axis OA2, and are arranged in the rear side of first group lens 19 and the both sides section of reflection mirror 20. In addition, since luminous flux becomes narrow just behind iris means 64, the free space can be made on the side of the second group lenses 84a to 84d. In consideration of this respect, motor 66 for the iris means is shifted from the plane provided by first optical axis OA1 and second optical axis OA2, and is arranged on the side of the second group lenses 84a to 84d.

With this arrangement of such motor, plungers 34, 56, and 66, it becomes possible to perform valid use of the space in main body 1 of the electronic camera, and to prevent a part of the device from greatly projecting by performing the configuration balance of the whole shooting lens unit 11. Therefore, since the freedom degree of the design increases and efficient component arrangement becomes ease, the miniaturization of the camera becomes easy. In this embodiment, since first group lens 19 is movable to adjust the focus, it becomes advantageous for photographing (macro shooting).

Figure 9:
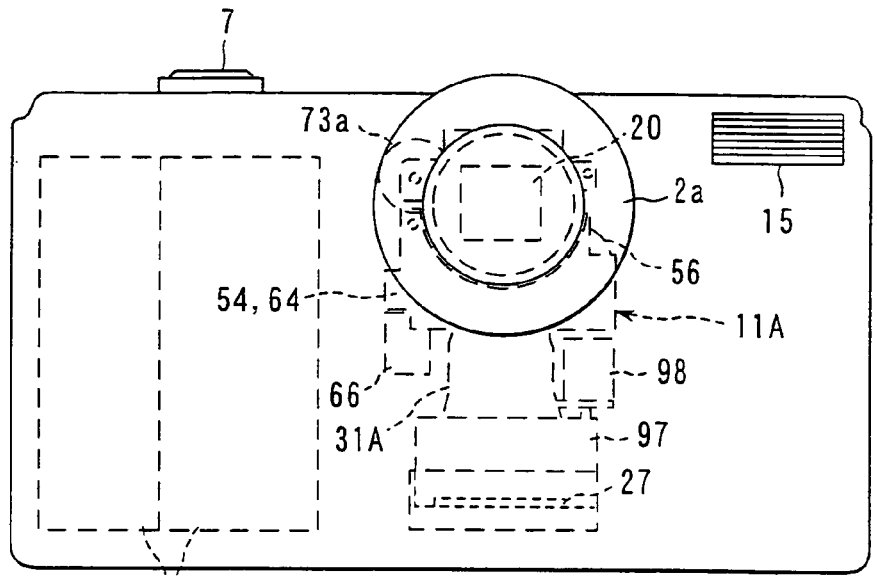
Figure 10:
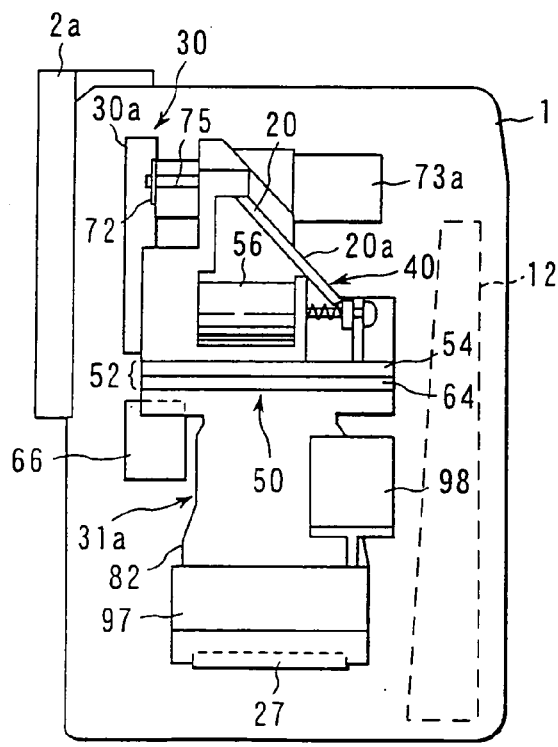
FIG. 10 is a side view, which shows the inside of the electronic camera and the outline of the shooting lens device shown in FIG. 9.

FIGS. 9 and 10 are a front view, which shows an electronic camera, which builds in the shooting lens device according to the fourth embodiment of the present invention and a side view, which shows externals of the inside of and an electronic camera and shooting lens devices, respectively.

The shooting lens unit 11A according to this embodiment has roughly the same configuration as shooting lens unit 11 shown in FIG. 6A, but a point that the rear fixation frame 31A further comprises zoom means 97 to perform zooming by moving some of the second group lenses 84a to 84d, differs from shooting lens unit 11 shown in FIG. 6A. Since zoom means 97 is driven, cylindrical rear mirror frame 82 is placed, and motor 98 for the zoom means is set at motor 66 for the iris means and a roughly symmetrical position.

While assembled for shooting lens unit 11 shown in FIG. 9, AF motor 73a, motor 66 for the squeezing means, and plunger 56 for the shutter means and motor 98 for the zoom means are arranged to place the plane provided by first optical axis OA1 and second optical axis OA2 between each other. AF motor 73a, plunger 56 for the shutter means, and motor 66 for the squeezing means and motor 98 for the zoom means are arranged to place the optical amount adjustment side (shutter side and squeezing respect) provided by the optical amount adjustment means (shutter means 54 and squeezing means 64) between each other. In other words, AF motor 73a, plunger 56 for the shutter means, and motor 66 for the squeezing means and motor 98 for the zoom means are arranged in each of divided four spaces by the optical amount adjustment side provided by a planar provided by first optical axis OA1 and second optical axis OA2, and an optical amount adjustment means 54 and 64.

With such arrangement of motor, plunger 34, 56, and 66, it becomes possible to perform valid use of the space in main body 1 of a camera electronic camera, and to prevent a part of the device from greatly projecting by performing the configuration balance of the whole shooting lens unit 11. Therefore, since the freedom degree of the design increases and efficient component arrangement does easily, the miniaturization of the camera becomes easy.

Figure 11:
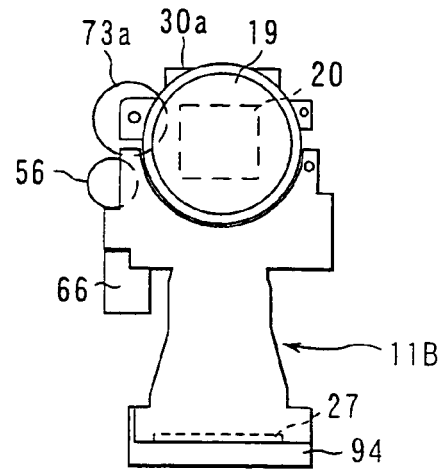
FIG. 11 is a front view, which shows shooting lens device for the electronic camera according to the fifth embodiment of present invention.

FIG. 11 is a front view, which shows the shooting lens device for an electronic camera according to the fifth embodiment of the present invention.

The shooting lens unit 11B according to this embodiment has roughly the same configuration as shooting lens unit 11 shown in FIG. 6A, but a point that plunger 56 for the shutter means is arranged on the other side for reflection mirror 20 with that of shooting lens unit 11 shown in FIG. 6A, is different from shooting lens unit 11 shown in FIG. 6A. That is, AF motor 73a and plunger 56 for the shutter means and motor 66 for the iris means are arranged together on the other side of the planar provided by first optical axis OA1 and second optical axis OA2.

With such an arrangement of motor, plunger 73a, and 56 and 66, it becomes possible to arrange the control wiring to motor, plunger 73a, 56 and 66, efficiently. However, by such an arrangement of the motor and the plunger, since the entire configuration balance of shooting lens unit 11 collapses, it is not advantageous from the viewpoint of the miniaturization of the camera.

The sixth embodiment of the present invention will be explained, but since a basic configuration of the electronic camera is similar to FIGS. 6A, 6B and 7, drawings and a detailed explanation will be omitted. The sixth embodiment is an embodiment, which shows the decomposition of shooting lens unit 11 and the concrete example of the assembly method.

FIG. 12A to FIG. 14E are figures, which show shooting lens unit 11 with assembles or decomposition, and are specifically shown as follows.

Figure 12A:
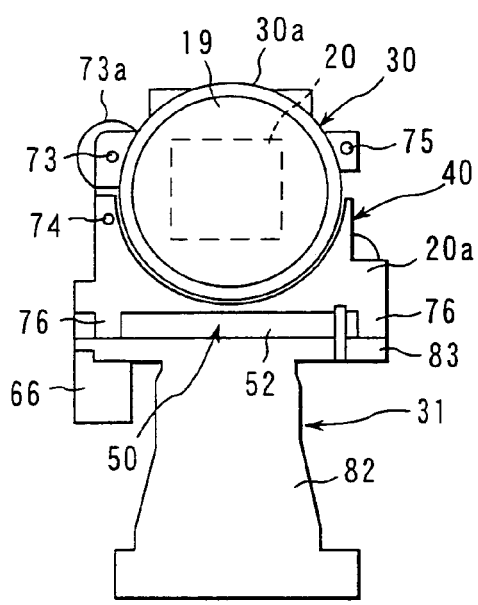
Figure 12B:
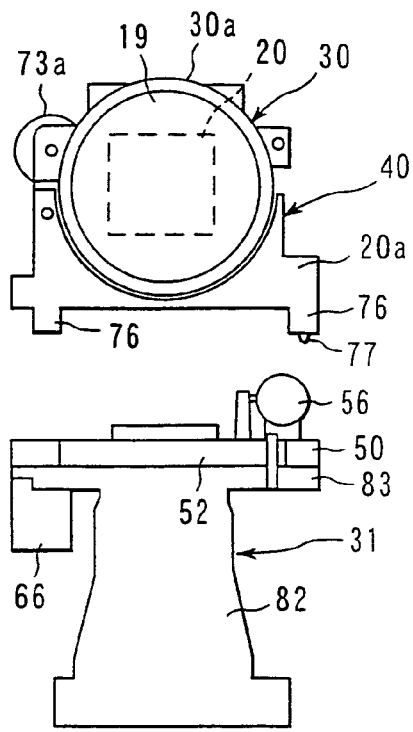
Figure 12C:
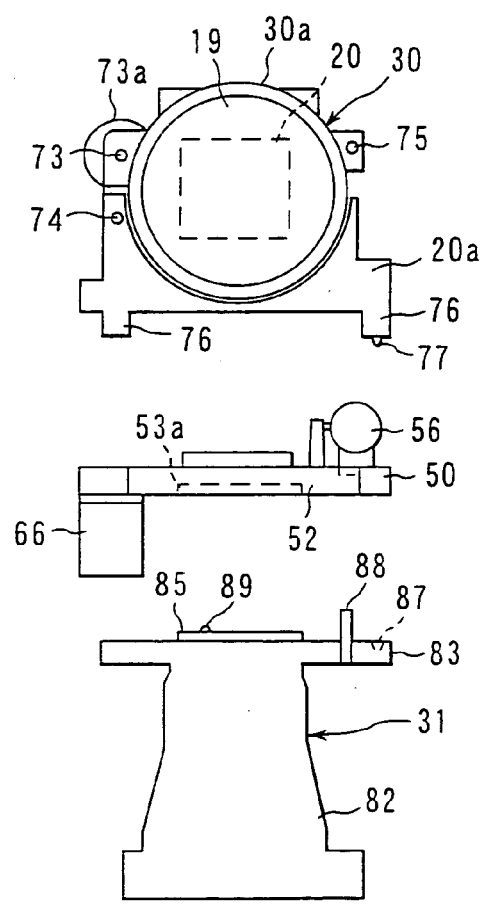
Figure 13A:
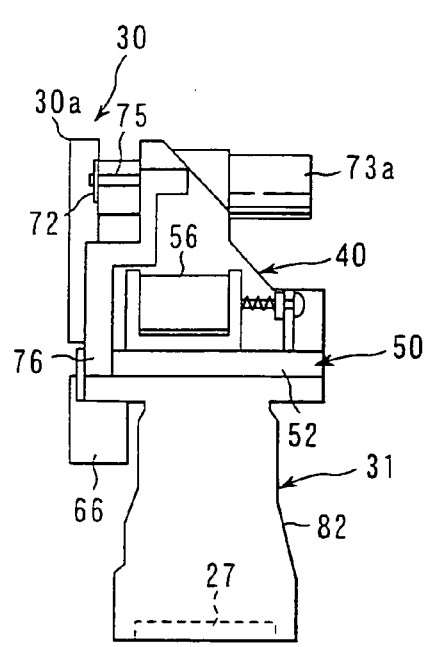
FIGS. 13A to 13C are side views which correspond to FIGS. 12A to 12C, respectively.
Figure 13B:
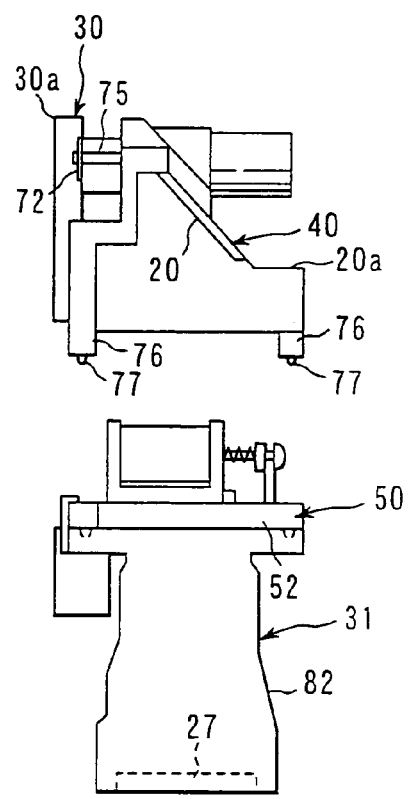
Figure 13C:
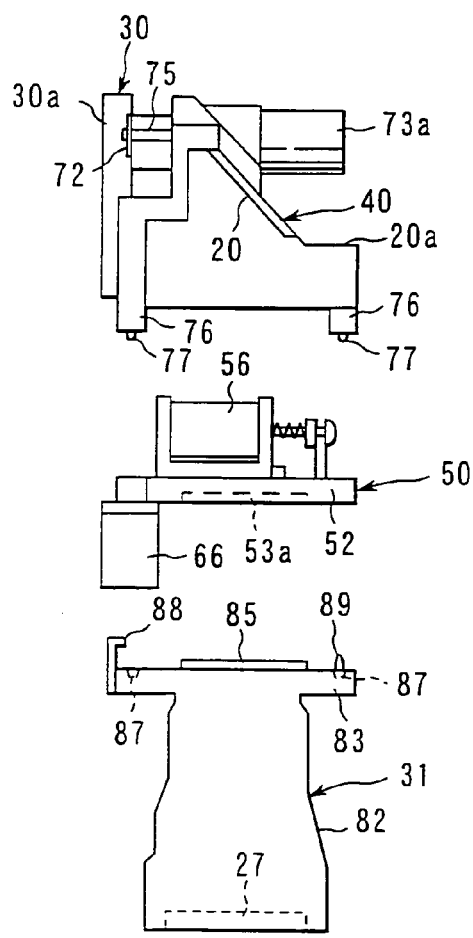

In shooting lens unit 11, FIG. 12A shows a front view showing a state to assemble all units 20, 30, 50, and 80, FIG. 12B shows a state which decomposes into unit 20, 30, unit 50, and 80, FIG. 12C shows a state which decomposes into unit 20, 30, unit 50, and unit 80. FIGS. 13A to 13C are side views, which correspond FIGS. 12A to 12C, respectively.

Figure 14A:
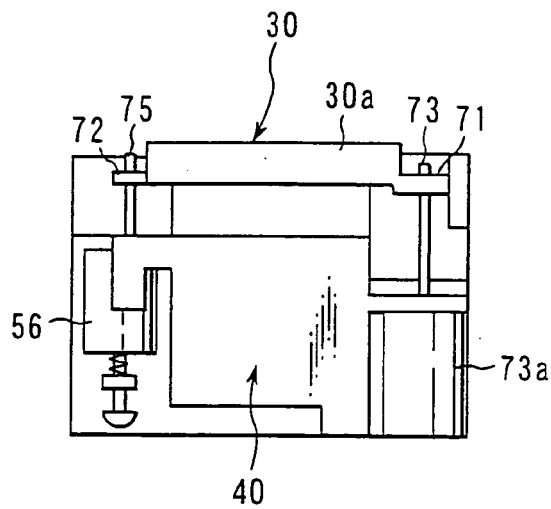
Figure 14B:
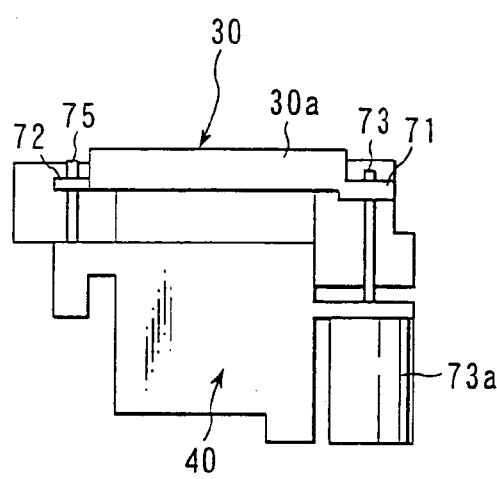
Figure 14C:
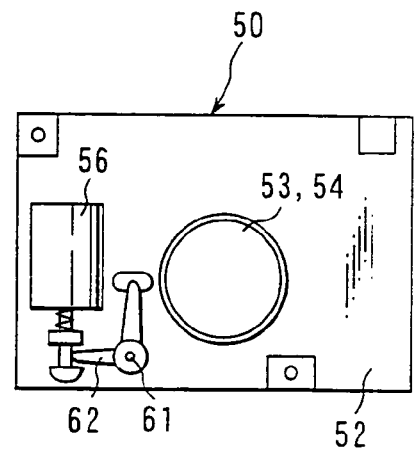
Figure 14D:
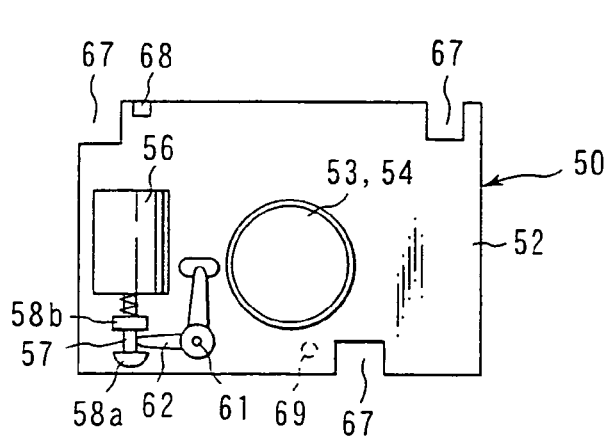
Figure 14E:
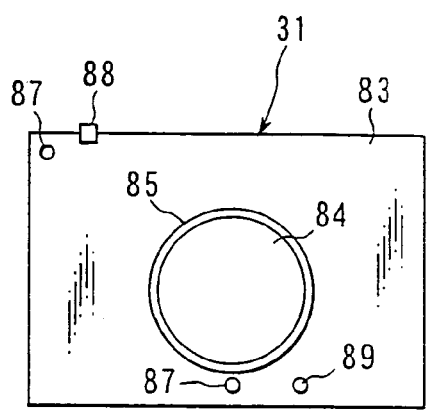

In shooting lens unit 11, FIG. 14A shows a plan view in a state to assemble all units 20, 30, 50, and 80, FIG. 14B show a state to assemble unit 20 and 30, FIG. 14C shows a state to assemble unit 50 and 80, FIG. 14D shows single unit 50, and FIG. 14E shows single unit 80.

Front fixed frame 30 has ring front mirror frame 30a, and first group lens 19 is fixed in front mirror frame 30a. The first group lens 19 is arranged to take luminous flux from subject along first optical axis OA1 (which is directed in the horizontal direction).

Flanges 71 and 72 are attached to both sides of front mirror frame 30a, respectively (see FIG. 14A), the female screw section and the bearing hole are set to flange 71 at top and bottom, and the bearing hole is set in flange 72. These flanges 71 and 72 are installed on horizontal screw shaft 73 set to optical axis conversion unit 40 by the following modes, two guide shafts 74 and 75 (see FIG. 12A), as a result, front fixed frame 30 can be movably held to optical axis conversion unit 40.

Optical axis conversion unit 40 has mirror frame 20*a* which forms the inclined plane by 45° for first optical axis OA1 and second optical axis OA2 of the first shooting lens unit 11. Reflection mirror 20, which is the reflection means, that is, the optical axis conversion means, is bonded to this 45° inclined plane of mirror frame 20*a* (see FIG. 13B). Luminous flux, which passes first group lens 19, is reflected with reflection mirror 20, and is bent along second optical axis OA2 (directed to vertical direction) by 90°.

Rotation motor 73*a* for AF (auto focus) is set in optical axis conversion unit 40 (see FIG. 14A). Screw shaft 73 of AF motor 73*a* is extended in parallel to first optical axis OA1, the male screw section in the point is connected with the female screw section set in the upper part of flange 71 of front mirror section 30*a* of front fixed frame 30. Therefore, front mirror frame 30*a* is moved back and forth along the rotation of shaft 35. Two parallel guide shafts 74 and 75 are set in optical axis conversion unit 40 for first optical axis OA1, and these are inserted and passed respectively into the bearing hole set in corresponding flanges 71 and 72 of front mirror frame 30*a*. That is, front mirror frame 30*a* is moved in parallel to first optical axis OA1 with first group lens 19 by the driving of AF motor 73*a* according to shafts 74 and 75, and, as a result, the focus adjustment is performed.

Three legs 76 are set under mirror frame 20*a*, and pin 77 is attached to bottoms of each of two legs 76 among those (see FIG. 13B). Pin 77 is installed in hole 87 formed to two places of the upper surface of rear fixed frame 31 by the following modes, and, as a result, optical axis conversion unit 40 is fixed to the predetermined position on rear fixed frame 31.

Optical amount adjustment unit 50 has smooth frame 52 in which aperture 53 to pass the luminous flux bent with reflection mirror 20 along the second optical axis OA2 is formed (see FIG. 14D). Frame 52 is set to have the same thickness as the height of leg 76 of optical axis conversion unit 40. To open and shut aperture 53 and adjust the area of an aperture, shutter means 54 and iris means 64 are set in frame 52. Plunger 56 is set in upper part of frame 52 to drive shutter means 54 (FIG. 14D), while stepping motor 66 is set under frame 52 to drive iris means 64 (FIG. 12C).

Shutter means 54 is constructed to open and shut along with the rotation of L type rotation lever 62 which is shafted in the rotatably by frame 52 centering on axis 61 (see FIG. 14D). The other arm of rotation lever 62 is connected with shutter means 54, and the other arm is placed between flanges 58*a* and 58*b* the couple installed on iron core 57 of plunger 56. Plunger 56 of shutter means 54 consists of the solenoid coil, which moves iron core 57 in back and forth at high speed. Coil spring 59 is installed in iron core 57 between motor and flange 58*b*. Therefore, rotation lever 62 is rotated by the high-speed reciprocation of iron core 57 of plunger 56, and, as a result, shutter means 54 is opened and shut.

Connection recess 68 is formed at the upper surface of frame 52 of optical amount adjustment unit 50, and hole 69 is formed to one place of the lower side. Ring recess 53*a* is formed under frame 52 to surround aperture 53 (see FIG. 12C). Connection recess 68, hole 69, and recess 53*a* are connected with hook 88 set on rear fixed frame 31, pin 89, and salient 85 by the following manners, and, as a result, optical amount adjustment unit 50 is fixed to the predetermined position on rear fixed frame 31. In addition, in frame 52, rectangular cut-out 67 is formed to three places of surroundings to prevent from this etc. corresponding to three legs 76 of mirror frame 20*a* of optical axis conversion unit 40 (see FIG. 14D).

Rear fixed frame 31 has cylindrical rear mirror frame 82, which is fixed to the camera case 12, and the second group lenses 84*a* to 84*d* are fixed in rear-mirror frame 82. Second group lenses 84*a* to 84*d* is arranged so that luminous flux, which is reflected with reflection mirror 20 along the second optical axis OA2 (vertical direction) and passes through aperture 53 of optical amount adjustment unit 50, is imaged for the photoelectric conversion imaging element, that is, imaging element 27.

Flat upper frame 83, to which aperture 84 for the top section of rear mirror frame 82 to pass the luminous flux bent with reflection mirror 20 along second optical axis OA2 is formed, is set (Refer to FIG. 14E). Hole 87, hook 88, and pin 89 are set on upper frame 83 in two places. Ring salient 85 is set in surroundings of aperture 84 on upper frame 83 (see FIG. 12C). Hole 87 connects with pin 77 of optical axis conversion unit 40, salient 85 engages with recess 53*a* of optical amount adjustment unit 50, pin 89 connects with hole 69 of optical amount adjustment unit 50, thereby optical axis conversion unit 40 and the optical amount adjustment unit are fixed to the predetermined position on rear fixed frame 31. In addition, hook 88 is connected with connection recess 68 of optical amount adjustment unit 50, and optical amount adjustment unit 50 is prevented dropping out.

When shooting lens unit 11, with the above-mentioned configuration, is assembled, front fixed frame 30 is installed on optical axis conversion unit 40, first. This work can be performed by connecting shafts 35 36, and 37 of optical axis conversion unit 40, with flange 71 and flange 72 of front mirror frame 30*a* of front fixed frame 30. Thus, a first block constructed by front fixation frame 30 and conversion unit 40 is assembled.

On the other hand, optical amount adjustment unit 50 is fixed on rear fixed frame 31 by connecting hook 88, pin 89, and salient 85 of rear fixed frame 31 with connection recess 68, hole 69, and recess 53*a* of optical amount adjustment unit 50. Thus, a second block constructed by light amount adjustment unit 50 and back fixation frame 31 is assembled.

Next, the first block consisting of front fixed frame 30 and optical axis conversion unit 40 is fixed to the second block consisting of optical amount adjustment unit 50 and rear fixed frame 31. In this case, optical axis conversion unit 40 is combined with rear fixed frame 31 to place among optical amount adjustment units 50. That is, pin 77 of the bottom surface of leg 76 of optical axis conversion unit 40 is inserted and fixed to hole 87 of rear fixed frame 31 and optical axis conversion unit 40 is fixed on rear fixed frame 31.

Since frame 52 is set to have the same thickness as the height of leg 76 of optical axis conversion unit 40, optical amount adjustment unit 50 is placed while sticking between optical axis conversion unit 40 and rear fixed frame 31. Therefore, the relative position in the vertical direction of optical axis conversion unit 40, optical amount adjustment unit 50, and rear fixed frame 31 are more fixed.

Next, shooting lens unit 11 assembled thus is fixed to camera case 12. Imaging element 27 can be installed on rear fixed frame 31 during the assembly or after the assembly of shooting lens unit 11.

With shooting lens unit 11 assembled, since front fixed frame 30 and optical axis conversion unit 40 construct one block, an optical relative relation with first group lens 19 which can be moved and reflection mirror 20 which is the optical axis conversion means is surely maintained, and an excellent picture quality comes to be guaranteed. With shooting lens unit 11 assembled, since units 20, 30, 50, and 80 are substantially integrated, an optical relative relation with the first group lens 19, reflection mirror 20 which is the optical axis conversion means, and the second group lenses 84a to 84d are maintained surely, and an excellent picture quality comes to be guaranteed.

It is easy to perform the work the assembly, and the check, etc. of manufacturing shooting lens unit 11, since units 20, 30, 50, and 80 are individually produced, respectively, and can decompose if necessary after the assembly. It becomes advantageous for photographing (macro shooting), since it is assumed that first group lens 19 is movable for the focus adjustment. In addition, reflection mirror 20 can be reduced since shutter means 54 of optical amount adjustment unit 50 and iris means 64 are set in the neighborhood of reflection mirror 20 of optical axis conversion unit 40, the whole shooting lens unit 11 is miniaturized and is becomes advantageous.

Optical amount adjustment unit 50 is set between optical axis conversion unit 40 and rear fixed frame 31 in the above-mentioned embodiment, but it may be also possible that front fixed frame 30 transfers optical amount adjustment unit 50 previous. In the above-mentioned embodiment, optical amount adjustment unit 50 is constructed as an independent unit, but it may be possible that light amount adjustment unit 50 and rear fixation frame 31 are constructed as a unit from first, or the optical amount adjustment means (shutter means 54 and squeezing means 64) is set as a part of rear fixed frame 31.

In each above-mentioned embodiment, a case that it applied the present invention to an electronic camera, which is one of electronic imaging devices is explained, but if it is the one that it used the imaging element, it is not limited to an electronic camera, and of course, the present invention may be applied also to a video camera etc.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An electronic imaging device which performs a photoelectric-conversion of a subject light with an imaging element and records the converted subject light, said device comprising:
    a first lens group which takes in a luminous flux from a subject along a first optical axis;
    an optical axis conversion member which bends the luminous flux along a second optical axis which intersects with the first optical axis after taking in the luminous flux passing through the first lens group;
    a second lens group which images the luminous flux bent by the optical axis conversion member along the second optical axis to the imaging element;
    an optical amount adjustment unit which is provided between the optical axis conversion member and the second lens group, and which has at least one of a shutter function and a diaphragm function;
    an AF motor which moves the first lens group to perform focusing;
    a driving unit which drives the optical amount adjustment unit; and
    a zoom motor which moves the second lens group to perform zoom adjustment;
    wherein the AF motor, the driving unit, and the zoom motor are each arranged in any one of four spaces formed by a first plane defined by the optical amount adjustment unit and a second plane defined by the first and second optical axes.

2. The electronic imaging device according to claim 1, wherein:
    the AF motor is arranged in a first space behind the first lens group and on a same side of the optical amount adjustment unit as the axis conversion member;
    the zoom motor is arranged in a second space on a same side of the optical amount adjustment unit as the second lens group; and
    the driving unit for the optical amount adjustment unit is arranged in one of a third space and a fourth space.

3. The electronic imaging device according to claim 1, wherein:
    the optical amount adjustment unit comprises a shutter device and a diaphragm device;
    a driving member for driving the shutter device is arranged on a first side of the second plane; and
    a driving member for driving the diaphragm device is arranged at a second side of the second plane.

4. The electronic imaging device according to claim 3, wherein the optical amount adjustment unit comprises a diaphragm and shutter unit which simultaneously performs diaphragm and shutter control.

5. The electronic imaging device according to claim 1, further comprising a lens moving mechanism which moves the second lens group along the second optical axis.

6. The electronic imaging device according to claim 1, further comprising:
    a flash unit arranged in parallel to the second optical axis; and
    a power supply arranged in parallel to the second optical axis and at one end portion of a main body of the electronic imaging device;
    wherein the flash unit and the power supply sandwich the second optical axis.

7. An electronic imaging device which performs a photoelectric-conversion of a subject light with an imaging element and records the converted subject light, said device comprising:
    a first lens group which takes in a luminous flux from a subject along a first optical axis;
    an optical axis conversion member which bends the luminous flux along a second optical axis which intersects with the first optical axis after taking in the luminous flux passing through the first lens group;
    a second lens group which images the luminous flux bent by the optical axis conversion member along the second optical axis to the imaging element;
    an optical amount adjustment unit which is provided between the optical axis conversion member and the second lens group, and which has at least one of a shutter function and a diaphragm function;
    an AF motor which moves the first lens group to perform focusing;
    a driving unit which drives the optical amount adjustment unit; and
    a zoom motor which moves the second lens group to perform zoom adjustment;
    wherein the AF motor, the driving unit, and the zoom motor are all arranged at one side of a plane defined by the first and second optical axes.

8. The electronic imaging device according to claim 7, further comprising a lens moving mechanism which moves the second lens group along the second optical axis.

9. The electronic imaging device according to claim 7, wherein the optical amount adjustment unit comprises a diaphragm and shutter unit which simultaneously performs diaphragm and shutter control.

10. The electronic imaging device according to claim 7, further comprising:
a flash unit arranged in parallel to the second optical axis; and
a power supply arranged in parallel to the second optical axis and at one end portion of a main body of the electronic imaging device;
wherein the flash unit and the power supply sandwich the second optical axis.

11. An electronic imaging device comprising:
(i) an optical block including:
an optical axis conversion member including a reflection plane which reflects a subject light in a direction along a second optical axis that intersects a first optical axis along which the subject light enters the reflection plane;
a lens which is movable inside the optical unit; and
a first actuator which shifts the lens;
(ii) an optical amount adjustment unit including:
a shutter which is arranged on the second optical axis and is configured to open and close an aperture for passing a luminous flux; and
a shutter actuator which drives the shutter; and
(iii) an optical unit arranged on an opposite side of the optical amount adjustment unit from the optical block in the direction along the second optical axis, wherein the optical unit includes:
an imaging element arranged on the second optical axis; and
a lens arranged on the second optical axis between the imaging element and the optical amount adjustment unit;
wherein the first actuator and the second actuator are arranged on opposite sides of a first plane defined by the first and second optical axes.

12. The electronic imaging device according to claim 11, wherein the shutter actuator is provided on a same side as the first optical axis with respect to a second plane defined by a surface of the shutter.

13. The electronic imaging device according to claim 11, wherein the optical unit further comprises a second actuator which shifts a lens arranged inside the optical unit and is driven when zooming; and
wherein the second actuator is provided on a same side as the imaging element with respect to a second plane defined by a surface of the shutter.

14. The electronic imaging device according to claim 13, wherein each of the first actuator, the second actuator and the shutter actuator is arranged separately in any one of four spaces defined by the first plane and the second plane.

15. An electronic imaging device which performs a photoelectric conversion of a subject light reflected from a subject and records the converted subject light, said device comprising:
an optical amount adjustment unit including a shutter and a shutter drive device configured to open and close the shutter;
an optical axis conversion unit including: (i) a first lens arranged between the subject and the optical amount adjustment unit, (ii) an optical axis conversion member which is arranged between the subject and the optical amount adjustment unit and which bends the subject light, which is incident along a first optical axis, along a second optical axis that intersects the first optical axis, and (iii) a motor for driving the first lens; and
an optical unit including an imaging element arranged on the second optical axis, and a second lens for introducing the subject light which has been bent along the second optical axis to the imaging element;
wherein the optical amount adjustment unit is arranged between the optical axis conversion unit and the optical unit, and the shutter drive device and the motor are arranged on a same side of a first plane defined by the first and second optical axes.

16. The electronic imaging device according to claim 15, further comprising a liquid crystal display member which displays the subject light received by the imaging element as an image;
wherein the liquid crystal display member is provided on a back of an outer body of the electronic imaging device behind an optical unit block comprising the optical amount adjustment unit, the optical axis conversion unit and the optical unit.

17. The electronic imaging device according to claim 15, wherein the shutter drive device of the optical axis adjustment unit is provided in a vicinity of the optical axis conversion member.

18. The electronic imaging device according to claim 15, wherein the shutter drive device and the motor are both arranged at one side of the first plane defined by the first and second optical axes and which is further divided by a plane perpendicular to the first plane and defined by the optical amount adjustment unit.

19. An electronic imaging device which performs a photoelectric-conversiOn of a subject light and records the converted subject light, said device comprising:
an optical axis conversion member which bends the subject light, which is incident along a first optical axis, along a second optical axis that intersects the first optical axis;
an imaging element which captures the subject light which has been bent along the second optical axis;
a lens arranged between the optical axis conversion member and the imaging element;
an optical amount adjustment unit which is provided between the optical axis conversion member and the imaging element, and which adjusts an amount of the subject light incident on the lens;
an optical mount adjustment driving device which is arranged on the optical amount adjustment unit to open and close the optical amount adjustment unit; and
a motor for driving the lens;
wherein the optical amount adjustment driving device and the motor are both arranged at one side of a plane defined by the first and second optical axes.

* * * * *